Figure 1:
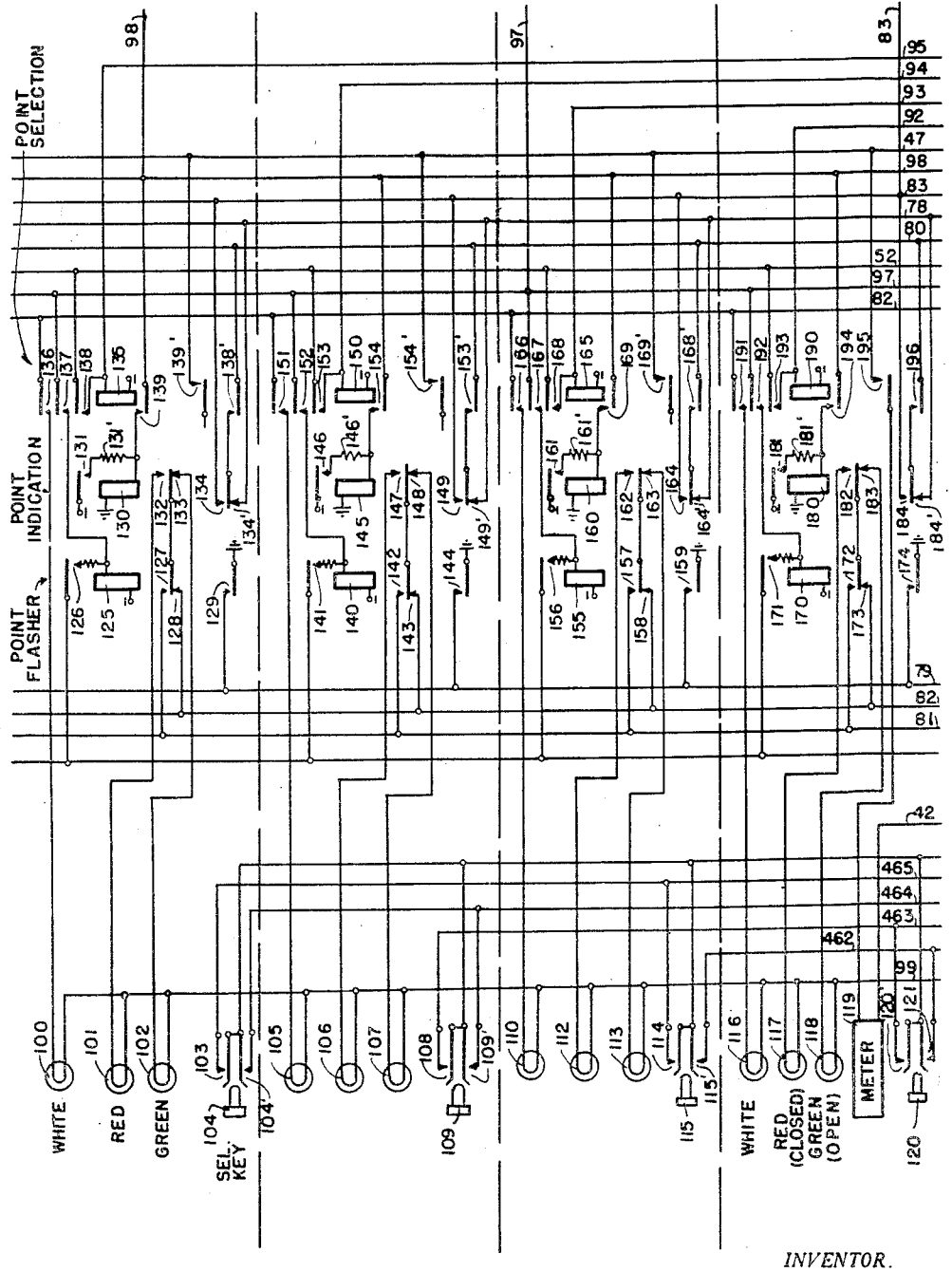
Figure 4:
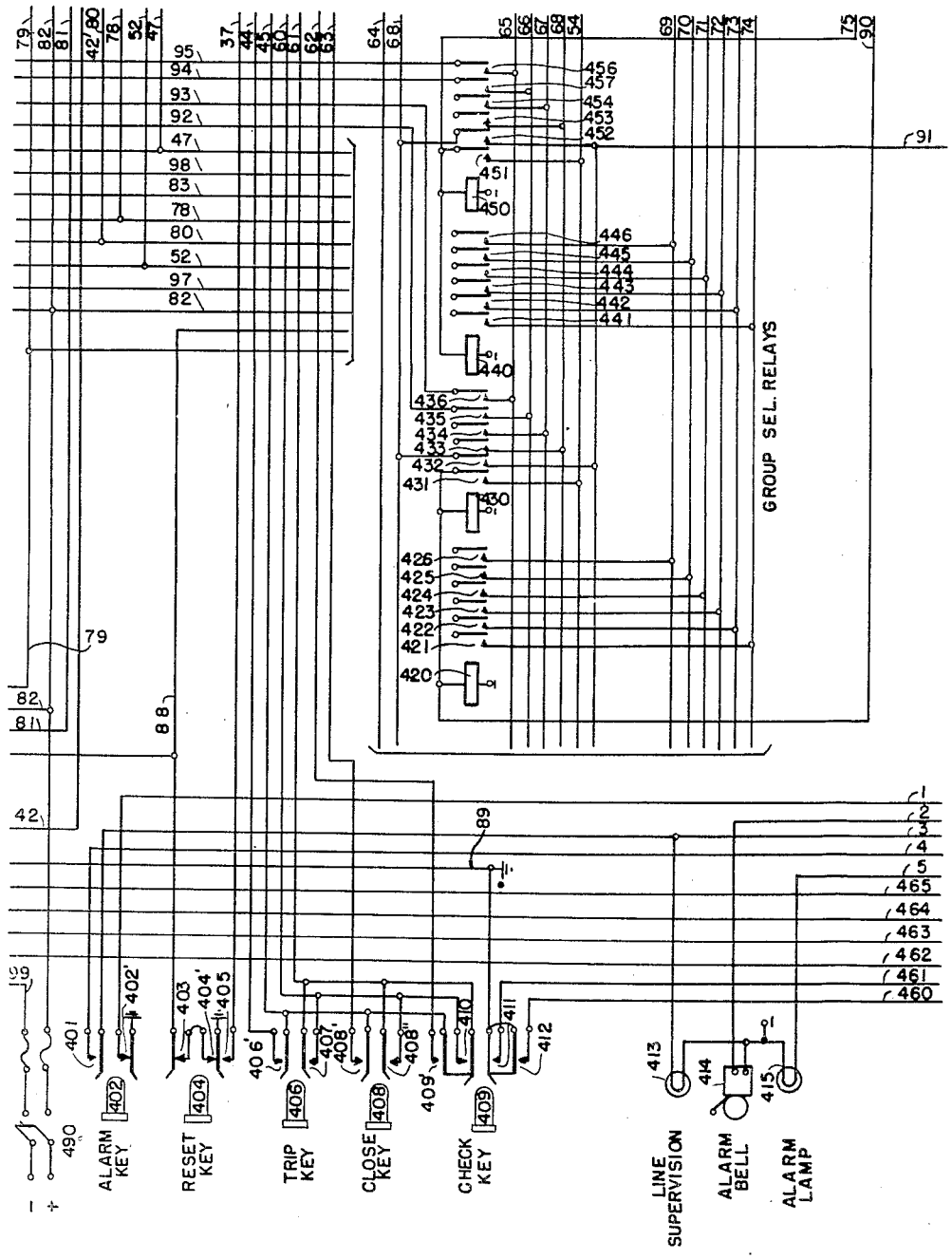
Figure 5:
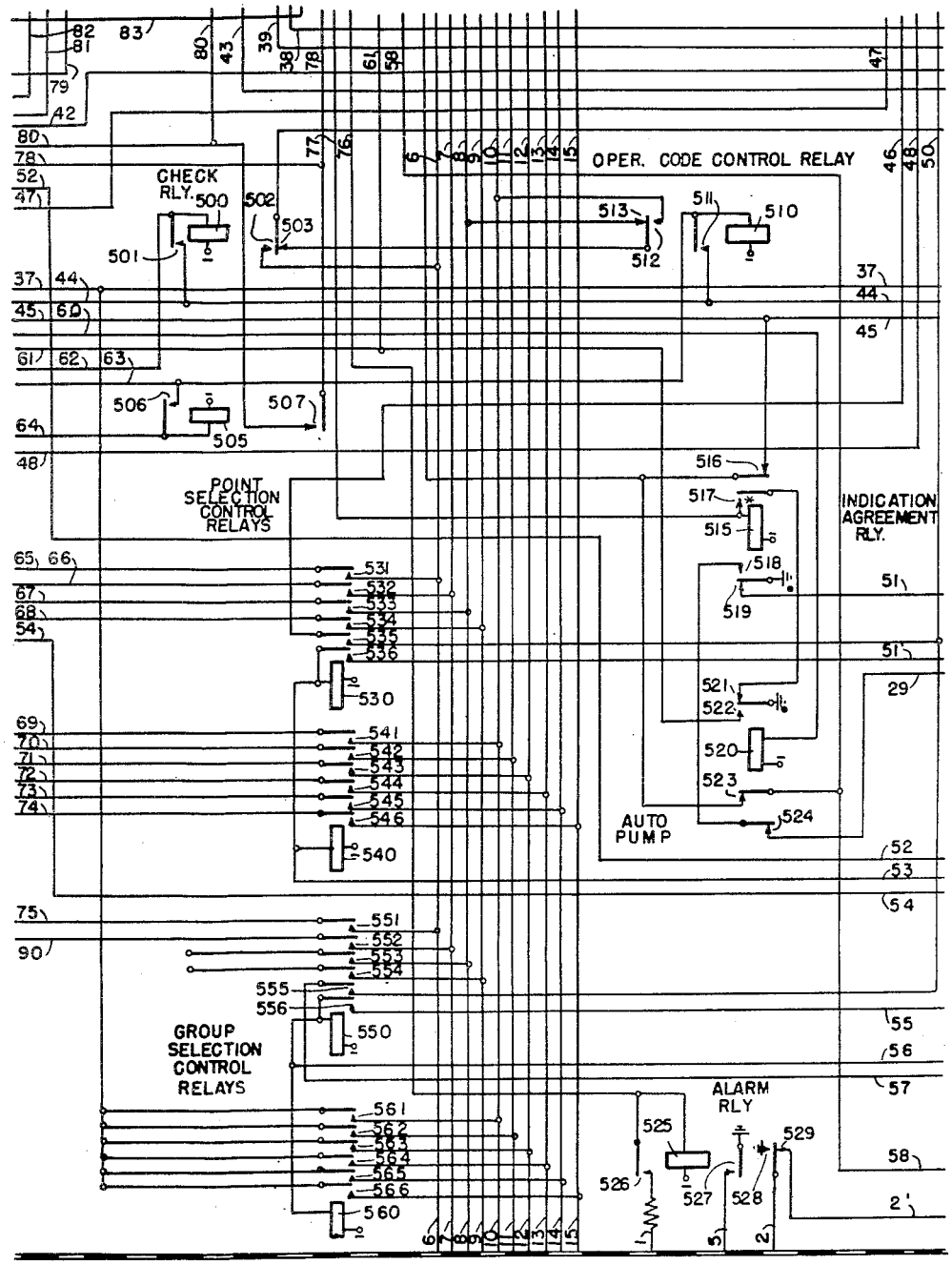
Figure 6:
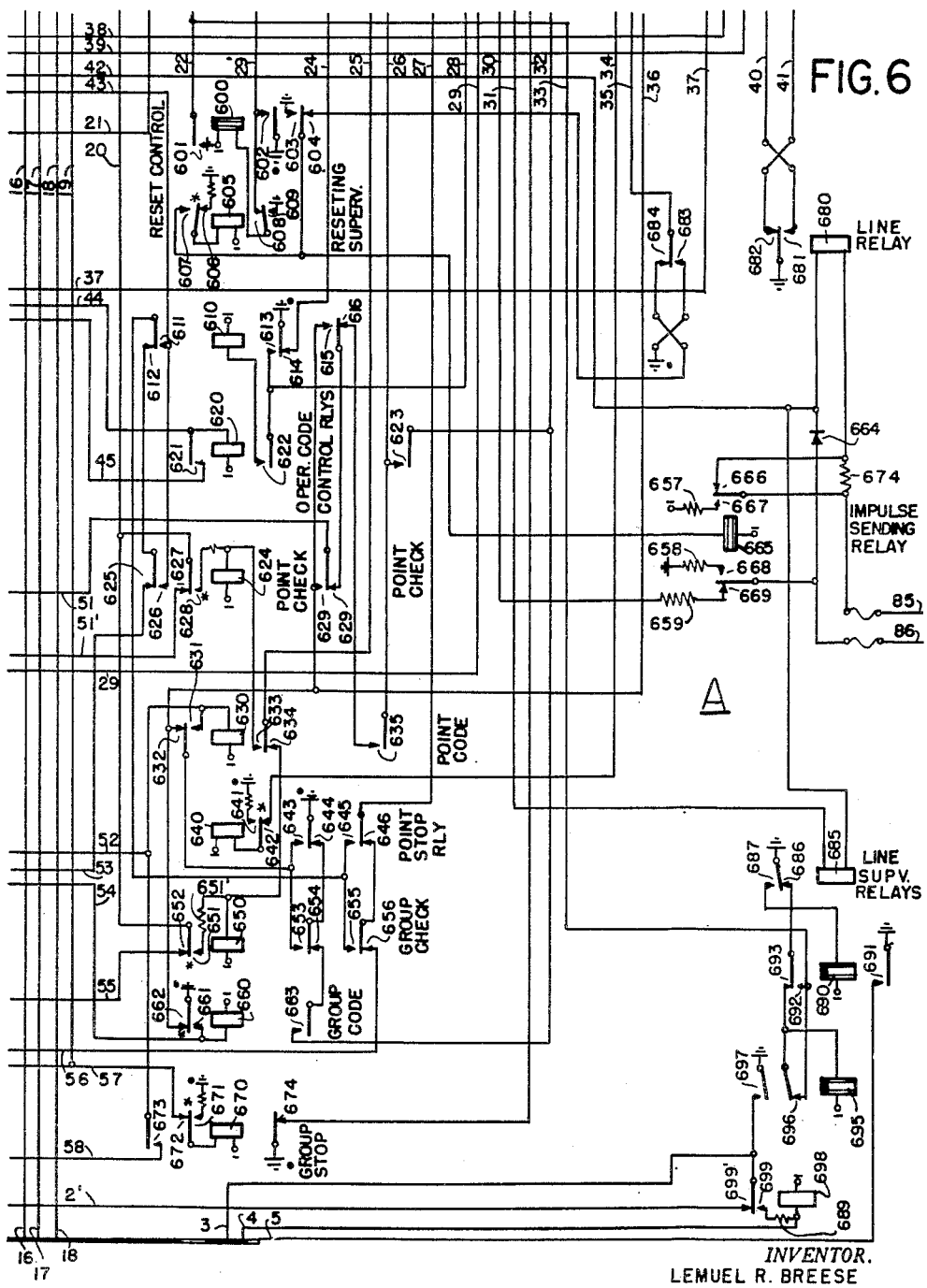

April 9, 1957 L. R. BREESE 2,788,515
TELEMETERING
Filed Sept. 1, 1950 14 Sheets-Sheet 2
FIG.13
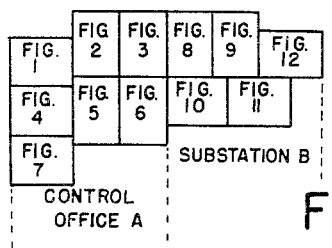
FIG.2
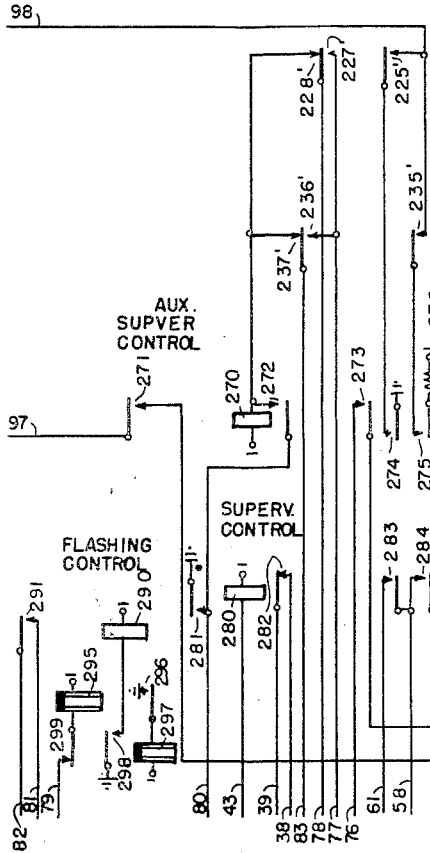
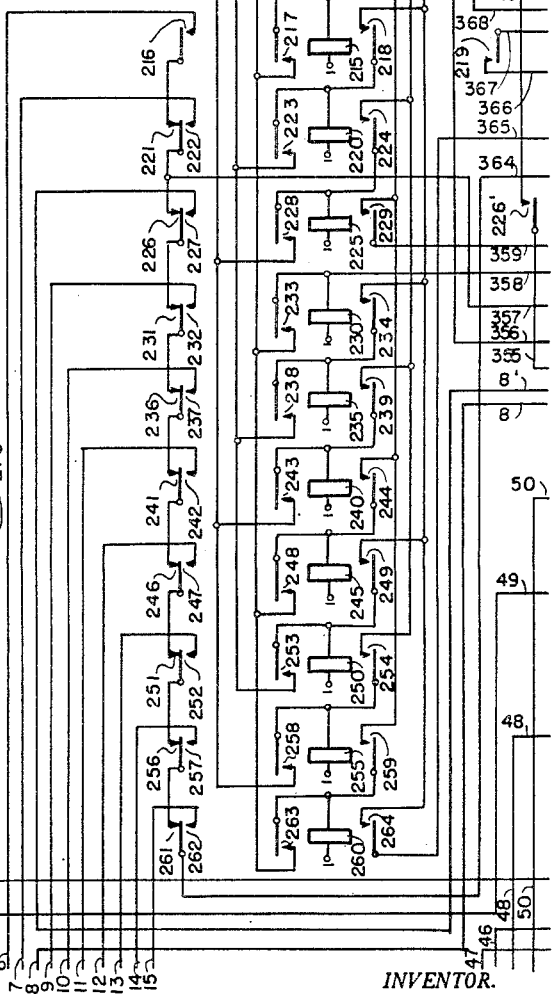
INVENTOR.
LEMUEL R. BREESE
BY Brown, Jackson, Boettcher & Dienner
ATTORNEYS April 9, 1957

L. R. BREESE 2,788,515

TELEMETERING

Filed Sept. 1, 1950

14 Sheets-Sheet 3

FIG 3

INVENTOR.
LEMUEL R. BREESE
BY Brown, Jackson,
Boettcher & Diemer
ATTORNEYS

INVENTOR.
LEMUEL R. BREESE

April 9, 1957 L. R. BREESE 2,788,515
TELEMETERING
Filed Sept. 1. 1950 14 Sheets-Sheet 11

INVENTOR.
LEMUEL R. BREESE
BY Brown, Jackson
Boettcher + Dienner
ATTORNEYS

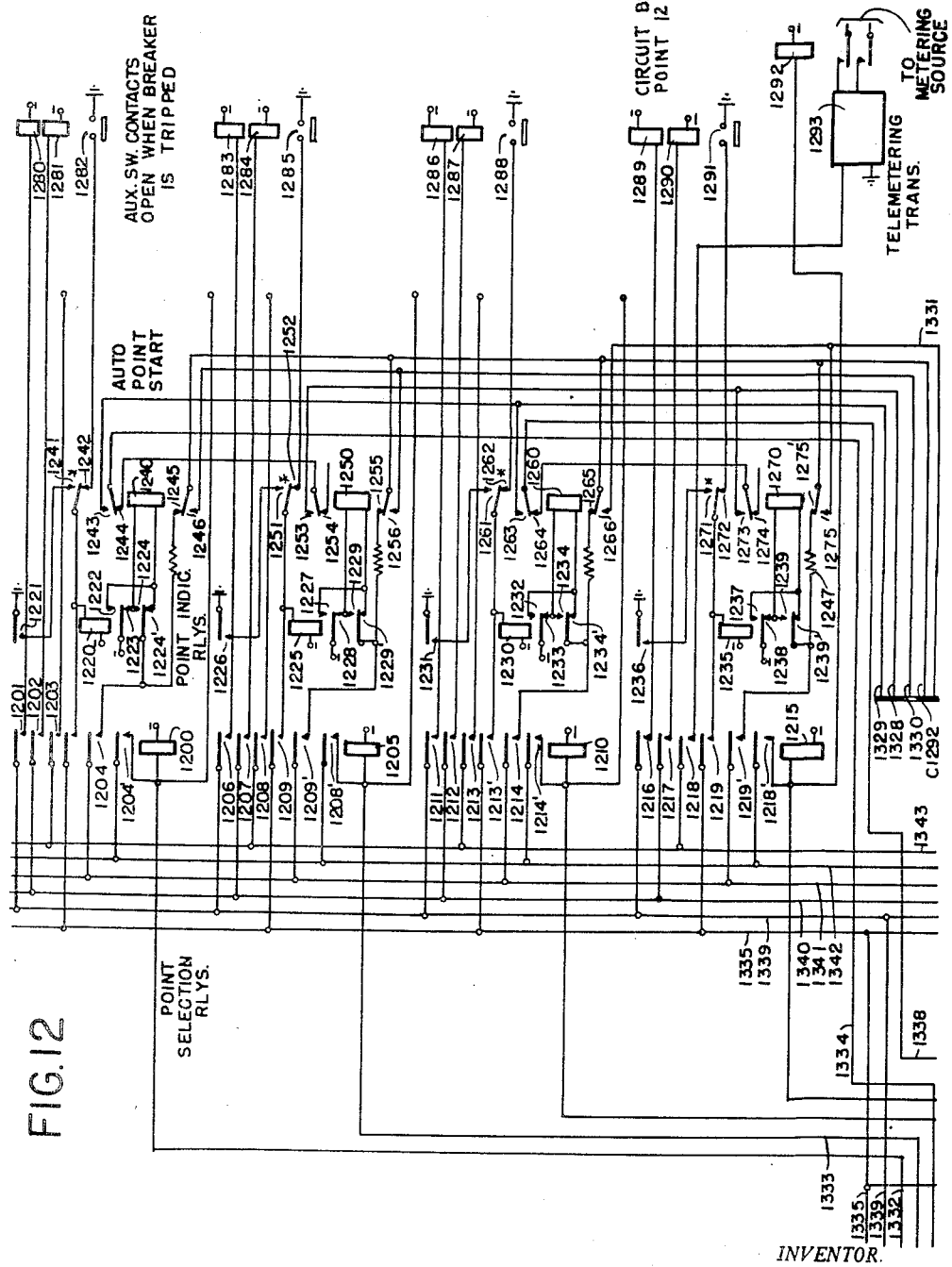

April 9, 1957

L. R. BREESE 2,788,515

TELEMETERING

Filed Sept. 1, 1950

14 Sheets-Sheet 13

INVENTOR.
LEMUEL R. BREESE
BY Brown, Jackson,
Boettcher & Dienner
ATTORNEYS

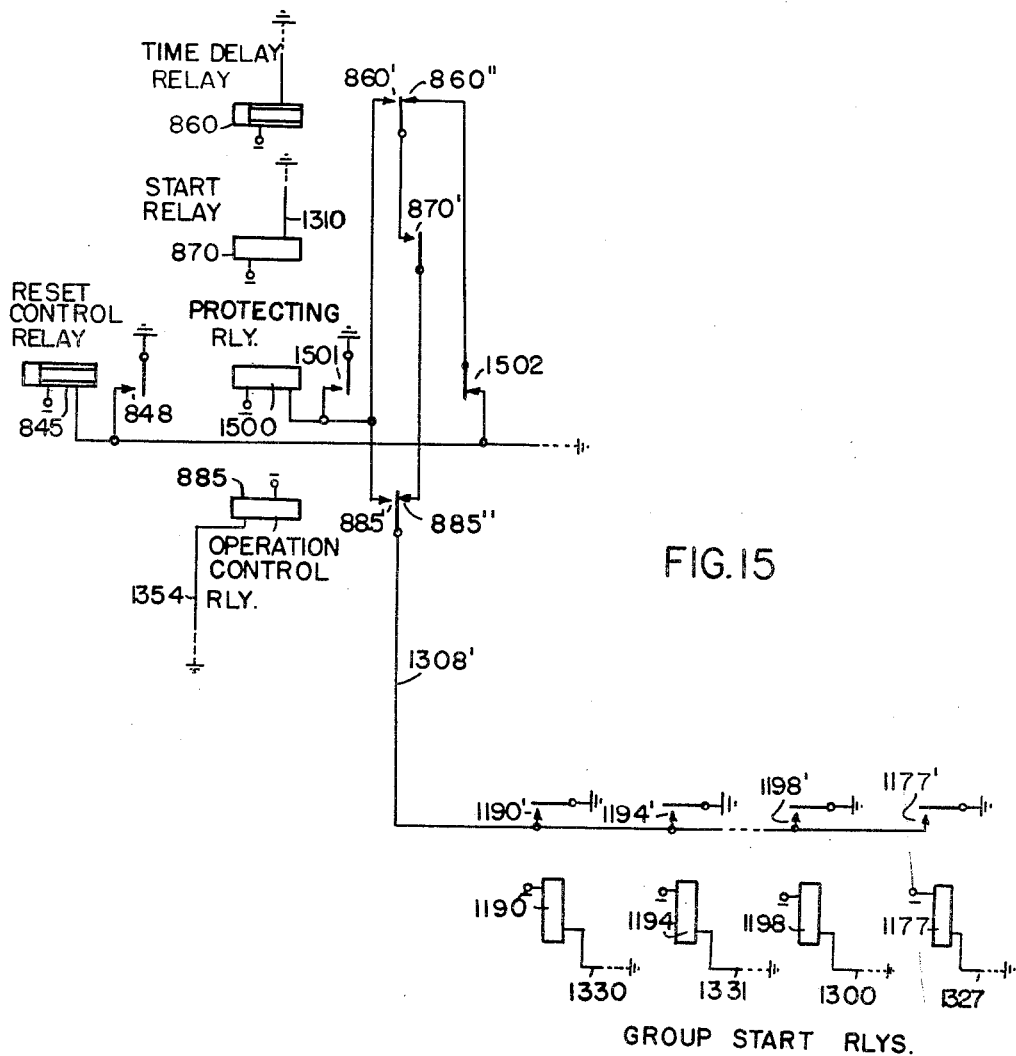

United States Patent Office 2,788,515
Patented Apr. 9, 1957

2,788,515

TELEMETERING

Lemuel R. Breese, Galion, Ohio, assignor to North Electric Company, a corporation of Ohio Application September 1, 1950, Serial No. 182,671

21 Claims. (Cl. 340—180)

The present invention relates in general to automatic signalling equipment which is adapted for control of a series of remotely disposed operating units, and is particularly concerned with the provision of new and novel information transmitting means for use with remote control systems of this general type.

As a result of the extensive demands of industry which are made of the various types of power systems today, the systems have become increasingly complex in structure and are invariably dispersed over large geographical areas. The individual maintenance and supervision of the various units of the system which are located at points distantly removed from each other is, of course, an expensive operation, and there has accordingly been a definite trend toward the centralization of control of the individual components of power systems at a single or control master station. Several specific examples of remote control applications in the field include the control of circuit breaker equipment for power lines, flood gates on dam installations, transformer switching and distribution stations, automatic substations such as used in railroading and mining fields, automatic electrified pumping stations, and substation generating installations.

Along with the trend toward centralized control, there has arisen an increasing demand for improved types of supervisory remote control equipment, and such demand has been particularly well met by the novel control system which has been set forth in a copending application which was filed by L. R. Breese et al., on April 4, 1950, which received Serial No. 153,962, now Patent No. 2,616,959, issued November 4, 1952, and which was assigned to the assignee of this invention. The present invention is directed to one of the features of that disclosure, and particularly to apparatus for providing indications at the control station of the condition of the controlled members at the distantly located stations.

The installation described in the copending application incudes a dispatch or control station which is arranged to control the operation of a plurality of circuit breakers (100 in number) disposed at a distantly located substation, such selective controlling operation being accomplished over a single communication channel which extends between the several stations. The control station is arranged to transmit certain signals or orders to the chosen substation and the substation is arranged to perform these orders and verify their execution. The equipment as disclosed therein effects four basic operations in each given controlling operation of a circuit breaker, that is—

(a) The selection by the operator of the circuit breaker unit to be controlled, (b) The transmission back by the substation of automatic check signals to provide proof of correct selection, (c) The operation of the selected circuit breaker, (d) The automatic indication of a change in the condition of the unit at the substation.

Other ancillary, supervisory, and control operations are also effected by the control equipment.

The operations are accomplished by the interexchange of codes of direct current impulses at the rate of approximately 15 impulses per second, the impulses being received by each station and offered to a series of relays which are arranged in a sequence arrangement which is conventionally known in the art as a counting chain. The impulses, as received by the counting chain, are in turn translated into selective operations of the associated equipment at the respective stations and the desired operation of the remote units, such as circuit breakers, is effected in an extremely competent, dependable, and reliable manner.

While the basic control and suervision of remotely disposed equipment is by far the most imortant application of the supervisory control systems, intelligent and competent control of the remotely disposed equipment requires that a complete informative picture of the condition of that equipment be available to the attendant at all times and modern control systems are accordingly equipped with so-called "telemetering" apparatus for effecting such functions.

The provision of such information, for reasons of economy, is desirably transmitted by the remote equipment to the attendant at the master station over the same single channel which is used for effecting the controlled operations of the remote units. It is immediately apparent that while such method is preferable from the standpoint of economy, serious problems arise in the maintaining of separate and distinct lines of division between the telemetering and operative functions, and it is to the provision of a new and novel telemetering arrangement, which solves such problems, that the present invention is directed.

According to a feature of the disclosed telemetering system of the invention, any indication which may be accomplished at the substation may also be effected at the control station, as for example, selective indications of the current, watts, or voltage of a chosen electrical circuit, of the water level in a given reservoir, of the degree of opening of a flood gate, and many others.

The manner in which the telemetered indications may be provided are almost as numerous as its possible applications. In one of the more conventional ararngements the equipment is arranged to provide automatic telemetered indications immediately upon selection of a circuit breaker point by the attendant, and to thereafter provide continuous telemetered indications until a reset key is operated, or until closing or trippng of the selected circuit breaker is effected. Another common arrangement is to provide telemetered indications of a selected point only as long as the atendant holds a preassigned selection key in the depressed position, the equipment automatically resetting as soon as the key is again released.

In a further application, telemetered indication may be transmitted continuously over supervisory control channel while the supervisory control equipment is at rest. The indications will be automatically interrupted when the supervisory equipment performs a control operation, and restored when the equipment returns to the normal at rest position.

In many installations telemetering is combined with a control function, and each control operation is followed closely by a telemetered indication of the degree of control effected to provide the attendant with a continuous picture of the status of the controlled unit. In application of such arrangement to a flood gate installation for instance, telemetering of the gate position may be effected as soon as the selection key is operated, and the changes of the gate position with each operation by the attendant of the raise or lower key is telemetered with each predetermined increment of change of the gate as effected. With each key operation after each movement, the telemetering will automatically be disconnected for a fraction of a second while the raise or lower signal is again transmitted. The operator may perform as many raise or lower operations as desired, meanwhile, receiving a telemetered indication until the equipment is reset by the attendant. The use of combined functions in effecting changes of feeder voltage regulators, transformer tap changers, motor operated valves, change of voltage, speed and loads on generators, and opening and closing of gates at hydro stations are only several of the applications to which such equipment may be applied.

In another embodiment, the equipment may also be arranged so that the device being controlled will start to move in the desired direction and will continue in its movement until terminated by the operator, intermittent spurts of telemetering being received during the continuous movement.

While extensive and varied applications for telemetering arrangements have been effected heretofore, the previous incorporation of known types of arrangements in a supervisory control system has in many cases seriously impaired the safe operating characteristics of the supervisory system, the arrangements being such that telemetering may possibly effect an improper operation of a controlled unit. Other arrangements which have attempted to obviate such shortcomings have generally required the addition of several slow operating relay units, which tend to further complicate the circuit operations, increase costs, and slow up the circuit operating time. Additionally, previously known telemetering arrangements have generally been such as to limit control of the remote equipment by the attendant whenever the telemetering equipment is operative, and "a tail wagging the dog" condition accordingly results.

There is, therefore, a definite need in the art for a novel, improved type telemetering circuit which may be safely incorporated with a supervisory remote control system and in which telemetering and supervisory control may each be established over a single channel without the danger of overlapping circuit operations, and it is the object of this invention to provide such desirable type circuit. It is a specific object of the invention to provide a telemetering circuit which is quicker acting in operation, simple in arrangement, which involves a fewer number of operating units, which is more economical in construction, and which maintains a strict divisional line between its several circuit operations.

For purposes of illustration the new and novel telemetering circuit arrangement is disclosed in the aforedescribed Breese control system in which a control station is adapted to selectively control a series of feeder circuit breaker units located at a distant station. Telemetering of the desired load characteristics of a particular one of the feeders is automatically effected responsive to the selection of that unit by operation of the assigned selection key. Should closing or tripping of the unit appear desirable, the attendant then operates the close or tripping key whereupon telemetering is interrupted and the equipment is reset to normal. In the event that operation of the circuit breaker is not necessary, telemetering is continuously effected until the reset button is operated. The manner in which the novel telemetering arrangement is adapted for use in others of the previously described telemetering applications becomes immediately apparent from the disclosed arrangement.

Other objects and advantages of the invention will be understood by reference to the following specification and accompanying drawings wherein selected embodiments of the structure are illustrated.

Figure 14:
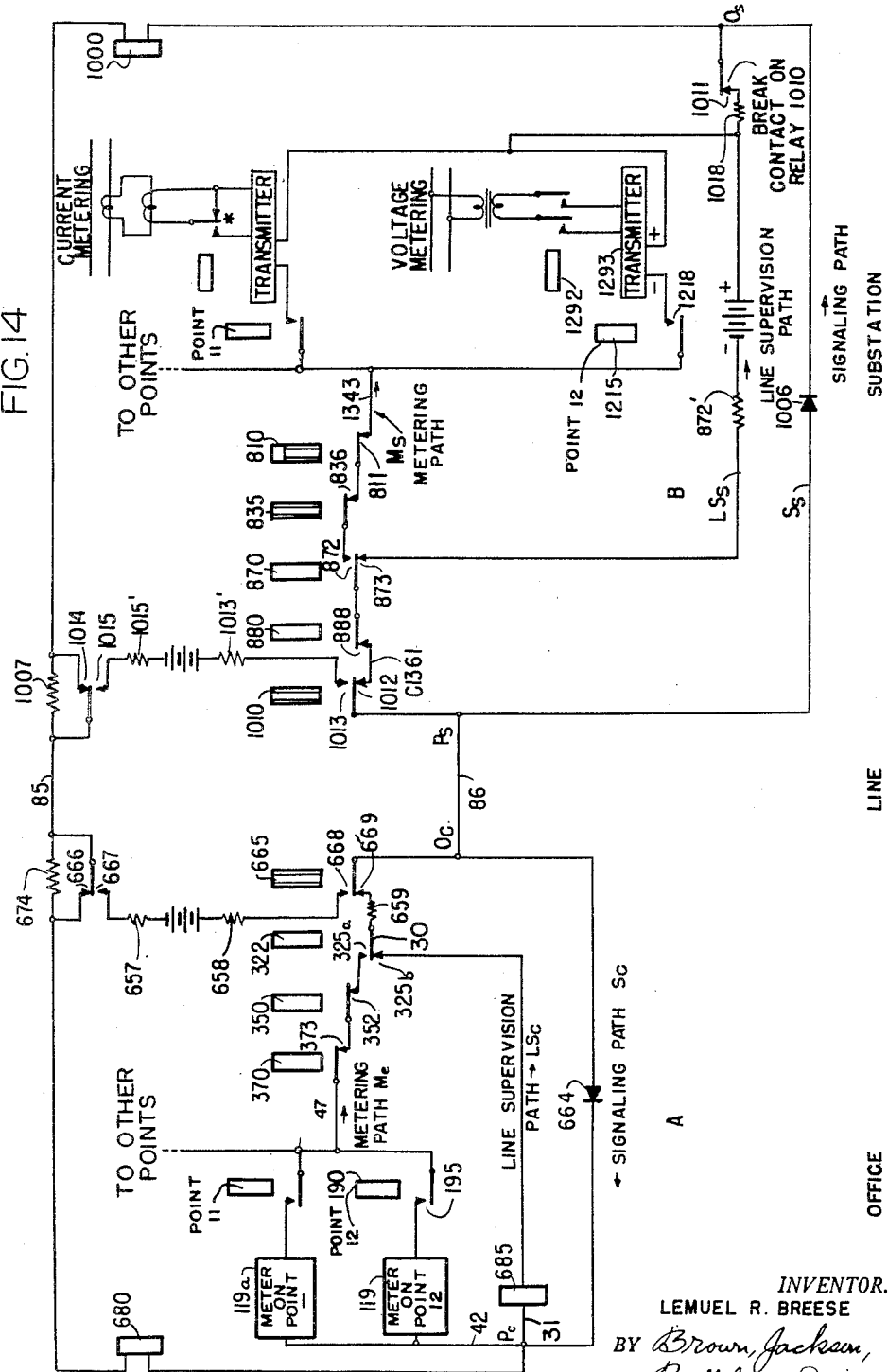

In the drawings:

Figures 1 to 12, when arranged in the manner of the figure layout set forth in Figure 13, are illustrative of the novel telemetering equipment as included in a specific installation, Figures 1 to 7 when arranged in proper order illustrating a control office and Figures 8 to 12 disclosing a series of circuit breaker units disposed at a remotely disposed substation; Figure 14 discloses in schematic form the telemetering, line supervision and signalling circuits in their basic forms; Figure 15 is illustrative of a modified arrangement whereby automatic signalling of change of position of one point is automatically effective even though equipment is at rest on another point.

*General description*

For purposes of illustration, the invention is disclosed in an arrangement comprising a dispatch or control office A which is adapted to automatically control equipment disposed at a distantly located substation B over a single signalling channel comprising a pair of line conductors 85 and 86. A control panel at the control station enables an attendant thereat to effect independent selective closing and tripping operations of a plurality of circuit breaker units disposed at the substation, to instantly determine the operated condition of any one of these circuit breaker units and to receive telemetered information concerning the circuit which is controlled by the circuit breaker at the selected point.

The circuit breaker units are of the conventional type, and in view of their similarity, only a few have been illustrated in the drawings. The circuit breaker at point twelve (12), for example, comprises a set of power controlling contacts (not shown), a close coil 1290, a trip coil 1289, and a set of auxiliary contacts 1291. Momentary energization of the close coil effects closing of the breaker and mechanical means hold the breaker in such position until such time as a momentary energization of the trip coil or occurrence of a line fault effects reopening thereof. Auxiliary switch contacts, such as 1291, are used to indicate the breaker position to the equipment at the control office.

The control equipment illustrated in the present embodiment is commonly referred to as the two-digit selection type which is operative to select any one of one hundred substation points (circuit breakers), it being understood that the features of the invention may also be embodied in the conventional one and three digit systems without departing from the scope of the invention.

In the two digit system, the points (circuit breakers and/or meters) are divided into groups of ten, whereby each point has a preassigned group and unit number and selection of the points may be accomplished by sequentially transmitting the group and unit identification numbers of the desired circuit breaker.

For example, group 1 of the points may comprise circuit breakers 1 to 10, group 2 may comprise circuit breakers 11 to 20, group 3 may comprise circuit breakers 21 to 30, etc. Thus, the circuit breaker at point 12 is the second point in the second group of points, and in selecting this point the group selection digit 2 and the point selection digit 2 are sequentially transmitted. Upon arriving at the point, automatic telemetering is effected and control of the circuit breaker thereafter may be accomplished by transmission of one of the control codes, in the given embodiment, three pulses for "trip" and five pulses for "close." In the event that circuit breaker operation is not required, the supervisory equipment is reset to normal by transmission of the reset code.

The installation is arranged to be controlled in its operation by a control panel which is disposed at the control station and which is divided into a series of smaller control and indicating panels, each of which is individual to a corresponding circuit breaker located at one of the substation points. Each of the individual panels may comprise an escutcheon plate which mounts an individual selection key for selecting its associated substation circuit breaker, a white selection lamp, a red indication lamp, a green indication lamp and an indicating meter for recording the particular telemetered information which the substation equipment is arranged to transmit for that point. The red indication lamp is illuminated whenever the circuit breaker located at the substation is in the closed position, and the green indication lamp is illuminated whenever the circuit breaker is in the open position. The white lamp associated with each of the individual control panels is operated with operation of the selection key and indicates to the operator that a particular point has been reached.

The nature of the metering equipment is determined by the type of information which is desirably provided for the attendant at the control station, and for purposes of illustration in the given embodiment, the indicating meter at the control panel for point 12 is shown as being a voltmeter instrument for indicating the voltage in the circuit controlled by the circuit breaker at substation point 12. The indicating meter at the control panel for point 11 is shown as an ammeter for indicating the current flow in the circuit controlled by the circuit breaker at substation point 11.

It is to be understood that any other types of information which may be indicated at the substation may also be telemetered at the control station and are to be considered as falling within the purview of the invention. The telemetering transmitters at the substation are conventional in nature and vary in accordance with the information to be transmitted and in view of their accepted status in the art are indicated in block form in this disclosure.

The main control panel also includes a group of common control units, such as an alarm key, reset key, an alarm lamp, a trip key, a close key, a check key, an alarm bell, alarm lamp and line supervision lamp.

Should a circuit breaker at the substation automatically change position, an alarm bell and an alarm lamp at the dispatch office flash to draw the attention of the attendant thereat, the red lamp at the associated point on the control board flashing if the circuit breaker is being closed and the associated green lamp flashing if the circuit breaker is being opened. Control keys at the panel enable the operator to silence the alarm bell, turn off the alarm lamp, or stop the flashing of the red and green indicating lamp by operating the alarm key.

The reset key on the control panel enables the operator to reset the equipment at the substation and the control office in the event of the occurrence of a stalled condition, that is a condition in which some of the relays are in the operated condition and have failed to restore the equipment to normal. The reset key is also used to restore the equipment subsequent to selection of a point for telemetering purposes.

In greater detail the initiation of a telemetering operation to procure the desired information from a given point is effected by operating the assigned point selection key at the control office. As the key closing operation is performed, the equipment at the control office is automatically effective to condition itself for the transmission of both a set of "key" pulses for unlocking the substation and control office equipment, and a set of group identification pulses assigned to the selected point or circuit breaker.

With receipt of the first impulse, the equipment at the substation is operative to condition the equipment thereat for acceptance of the incoming coded impulses. As the key or protective impulses are transmitted from the office to the substation, the counting chains at each of the installations are sequentially advanced to unlock the associated equipment whereby, with receipt of the following group identification pulses, the equipment at both stations will be operated to register the group identification numeral. It is to be noted that protective pulses are prefixed on the first digit first pulsing only, and that the equipment is completely conditioned for the entire series of codes by the first protective impulses transmitted. Following group registration, the transmitting equipment at the control office is automatically released and the control station is placed in the receiving condition. The substation equipment, on completion of the registration of the group selection digit, releases its receiving members and initiates operation of the transmitting apparatus thereat to transmit a combination of impulses to the control office which is indicative of the particular group actually selected, this checking operation being known as the group check operation.

The equipmment at the control office is operative in response to receipt of this checking code to compare the original and check-back signals, and upon agreement, to de-energize its receiving equipment, and re-energize its transmitting equipment to effect the transmission of the coded impulses which are representative of the unit identification numeral for the chosen circuit breaker.

The substation equipment is operated responsive to the receipt of the point selection digit and is effective to register the particular digit which has been transmitted. A check code, known as the point check digit, is thereupon transmitted back to the control office by the substation to indicate the particular point which has been selected. As the transmission of the point check digit is completed, the telemetering path for the selected substation point is completed thereat.

The equipment at the control office accepts the incoming point check code and upon agreement effects completion of the metering path thereat and connection of the pertinent metering unit (receiver) to the line. With the metering path at the substation also completed at this point, the meter equipment on the individual control panel for the selected point informs the attendant of the load conditions at the selected point. The white lamp on the same control panel is also illuminated to indicate to the attendant that the selection is complete. In the event that operation of the circuit breaker at the selected point is not necessary, the equipment is restored to normal by operation of the reset key.

In the event that it is necessary to trip or close the circuit breaker at the selected point, the close or the trip key is operated and the corresponding control code is transmitted to effect the desired operation of the selected unit at the substation to close or trip position. Following operation of the desired circuit breaker at the substation, a close or trip indication code, as the case may be, is transmitted by the equipment thereat to the control office to indicate to the attendant that the final operation of the unit has been accomplished. The equipment at the dispatch office is thereupon operative to restore its operating equipment to normal and to effect a similar restoration of the equipment at the substation. The line supervision equipment is likewise restored to its normal condition.

Therefore, a single signalling channel comprising two trunk conductors or any medium capable of transmitting impulses is operative to effect, in a first key selecting operation, the transmission of a set of "key" or equipment unlocking pulses, a set of group selecting code impulses, a set of unit selecting code impulses, (these later pulses being interposed by check impulses for the group and unit selection) and to thereafter effect automatic telemetering of the characteristics of the load circuit controlled by the circuit breaker at the selected point; it is noted that metering of the current magnitude type may be effected in installations which are interconnected by line conductors, and that impulse type metering is possible over installations employing line conductors, carrier equipment or radio channel equipment as the communication link.

The same signalling medium is also utilized by the substation apparatus to transmit signals to the control office to identify the automatic change of position of circuit breakers which may occur at the substation. That is, in the event of an automatic operation of a circuit breaker at the substation, the equipment thereat effects the transmission of the protective pulses and group identification pulses, and upon receipt of a group check-back signal from the control station, the transmission of the point identification pulses. After the substation receives a point check-back signal from the control station, the substation sends a trip or close indication code. Telemetering of the load characteristics is not effected at this time, however, and automatic reset of the equipment is effected immediately thereafter. These and other important supervisory control arrangements will be brought out more specifically by the following disclosure.

*Basic circuit description*

With reference now to the schematic sketch in Figure 14, the circuit arrangement thereshown illustrates the heart of the new and novel telemetering arrangement as adapted for use with the described remote control system. The control and controlled stations each basically comprise three separate and parallel control paths identified by the legends; metering paths Mc and Ms, line supervisory paths LSc, LSs and signalling path Sc, Ss. With the equipment in its normal condition, the line supervision paths LSc, LSs and the signalling paths Sc, Ss are parallelly connected at each of the stations in series with the line circuit conductors 85 and 86 and the line relays 680 and 1000. The metering paths Mc and Ms at each of the stations are normally disconnected from the line circuit and are arranged to be prepared for series connection with the line conductors and parallel connection with the signalling paths Sc and Ss simultaneous with disconnection of the line supervision paths LSc and LSs.

The alternative line supervision and metering path connections are performed at the control station by contacts 325a and 325b and at the substation by contacts 872 and 873. Completion of the prepared metering paths is effected following the completion of the point selection operation, such operation being more clearly brought out by the subsequent disclosure. Metering is thereafter continued until the reset key is operated.

Considering briefly the close interconnections of the line supervision, metering and signalling circuits, reference is again made to the sketch in Figure 14. As there shown, the signalling and line supervision paths will be normally completed and substation battery potential is supplied thereto over a circuit extending from positive battery over resistance 1018, contacts 1011, line relay 1000, contacts 1014, conductor 85, contacts 666, line relay 680, line supervision relay 685, conductor 31, contacts 325b, conductor 30, resistance 659, contacts 669, conductor 86, contacts 1012, conductor 1361, contacts 888, contacts 873, resistance 872' to negative battery.

The circuit characteristics are calculated so as to normally supply energizing current of approximately 2 milliamperes over the signalling channel. Line relays 680 and 1000 are low resistance relays which operate on approximately 6 milliamperes, whereas the line supervision relay 685 is a high resistance relay which operates at approximately 1½ milliamperes. It will be apparent, therefore, that the line relays 680 and 1000 will be normally restored and the line supervision relay 685 will be normally operated. It should be noted that rectifier 664 blocks current flow in the signalling path while the equipment is in the normal standby condition.

Assuming now the operation of the control station equipment to select a point for metering or operating purposes, impulse sending relay 665 at the control station is operated to transmit signals over both signalling paths Sc and Ss, the local path extending from positive battery at the control office over resistance 658, contacts 668, path Sc, rectifier 664, line relay 680, resistance 674, contacts 667 and resistance 657 to negative battery, and the second path extending from positive battery over resistance 658, contacts 668, C86, path Ss, rectifier 1006, line relay 1000, contacts 1014, C85, contacts 667 and resistance 657 to negative battery. The parallel connection of the line relays in the signalling arrangement, of course, effects a more positive acting relay arrangement.

With the initiation of signal transmission, outgoing start relay 322 at the control station is operated and is effective at its contacts 325a and b to control the disconnection of the line supervisory circuit LSc from the line circuit conductors 85 and 86, and to prepare the metering path Mc for parallel connection with the signalling path Sc.

A similar circuit transfer is effected at the substation by the incoming start relay 870 at its contacts 872 and 873. The metering paths are opened at several points for the period that the signals are operative to select the desired point and the operation of the meter by the transmitter signals is prevented. Further, with operation of the impulse relay contacts 668, the metering path is parallely connected with the signal path only during the interval that the open circuit condition exists in the signalling path. The danger of intermixing of telemetering and control signals is accordingly completely eliminated.

The metering paths are connected in parallel with the signalling paths to effect the metering operation only after selection of the desired point is effected. Assuming, for instance, the selection of point 12 at the substation, the energizing path for the meter associated with that point will extend from positive battery at the transmitter over resistance 1018, contacts 1011, line relay 1000, contacts 1014, C85, contacts 666, relay 680, C42, meter 119, contacts 195, C47 contacts 373, 352, 325a, C30, resistance 659, contacts 669, C86, contacts 1012, C1361, contacts 888, 872, 836, 811, C1343 and contacts 1218 to the negative battery at the transmitter. The telemetering current alone is insufficient to operate the line relays, and since the control station cannot connect potential to the line without disconnecting the metering circuit, the danger of false operation of the equipment during telemetering is eliminated. Reset of the equipment is effected by operation of the reset button whereupon the signalling and line supervision paths are parallelly reconnected in series with the line circuit.

Since the signalling paths Sc and Ss are connected to the line conductors 85 and 86 even during metering of a selected point, immediate signalling by the substation of a circuit breaker operation, which occurs after the close control code has been transmitted by the control station, can take place at any time without having to transfer the equipment from the metering to the signalling paths. For example, should an automatic trip occur at the substation during the period described, impulse sending relay 1010 is operated to transmit an indication of the trip which occurred. Since the signalling paths are connected for operation at all times, the signals are transmitted as soon as the sending equipment is energized and the metering path is immediately interrupted by contacts 1012. The signalling circuit thus assumes control in the desired manner, even though telemetering is being accomplished. The signalling paths for substation reporting extends locally from positive battery over resistance 1013', contacts 1013, rectifier 1006, line relay 1000, resistance 1007, contacts 1015 and resistance 1015' to negative battery. The second path extends from positive battery over resistance 1013', contacts 1013, conductor 86, rectifier 664, line relay 680 contacts 666, conductor 85, contacts 1015 and resistance 1015' to negative battery.

The foregoing paths have been traced to bring out more clearly the direction of current flow in the various paths and the advantages which accrue therefrom. First, it is noted that the battery potential sources for the metering circuit and the line supervision circuit are connected so that the metering and line supervision currents traverse through their respective paths and the line circuit conductors 85 and 86 in the same direction; it being remembered, however, that at no time are these two circuits simultaneously connected to the line circuit. Secondly, with reference to the directional arrows at the substation, it is seen that the signalling current is arranged to travel over the signalling path in the same direction as the currents which traverse the line supervision and metering paths thereat. On the other hand, the signalling path at the control station is arranged to conduct current in a direction opposite to that in which the currents in the line supervision and metering paths are conducted. An outstanding advantage of such arrangement is the ability to connect the line supervision, signalling, and metering circuits in parallel and still maintain a distinct division line between the energizing circuits for these circuits.

Also, with the parallel paths at the substation conducting in the same direction in the event that signalling is initiated by the control office during line supervision or metering, the currents of the several circuits will be additive and a stronger operative signal is provided. Specifically, a line relay pre-energizing effect is obtained whenever a signalling operation is effected following a metering operation or line supervision; the metering and supervisory currents in their flow through the line relays tending to effect partial energization of the line relay windings.

A further advantage inherent in the parallel connections is the elimination of the need for superimposing metering and signalling currents such as is practiced in previously known types of series circuit arrangements. Accordingly, the expense and time consuming operations of additional meter calibrations is eliminated.

These and many other advantages will become apparent with reference now to a specific embodiment of the telemetering arrangement in an improved type supervisory control system.

Description of apparatus

The arrangement as shown for purpose of illustration comprises a control office A and a substation B which are interconnected by a single signal channel comprising a pair of line conductors 85 and 86. Control office A includes a control panel which has been previously described herein, from which the attendant may control the operation of the automatic transmitting and receiving equipment at the control office and at the substation. The illustration of the individual points at the controlling office and substation has been restricted to the showing of several points such as points 11, 12, 21 and 22 in the interests of a clear and concise disclosure.

The transmitting and receiving equipment which is disposed at the substation and the control office are somewhat alike, and by reason of the large number of individual elements in each station the general disclosure of this equipment, together with their function, may be best set forth by means of the chart shown below:

Relay functions

| Control Location, Figs. 1–6 Relay | Substation, Figs. 7–12 Relay | Function |
|---|---|---|
| 680 | 1000 | Line Relay—Connected to the line wires 85 and 86 in parallel, being normally released. Operates when the line is energized for pulsing at either end. |
| 384 | 835 | Receiving Relay—Operates at the start of an incoming code. Since it is a slow-release relay, it does not release between impulses but releases only after a code of impulses has been completed. |
| 370, 380 | 825, 830 | Receiving Control Relays—Energize after the first impulse is completed in an incoming code. After selection has been made and locked up they release to terminate the receiving condition. |
| 665 | 1010 | Impulse Sending Relay—Operates to send impulses by energizing the line. |
| 360 | 820 | Sending Control Relay—Controls the operation of the Impulse Sending Relay. |
| 340, 350 | 810, 815 | Sending Drive Relays—Energize at the start of an outgoing code. After the code is completed they release to terminate the sending condition and release the counting chain. |
| 336 | -------- | Lockout and Reset Relay—Operates to cause reset of equipment if dispatcher's office and substation start sending simultaneously, and equipment attempts to send or receive more impulses than can be registered on the counting chain, or if a non-registering or transient code is received. |
| -------- | 805 | Lockout Relay—Operates to cause temporary lockout of the substation if two or more stations start sending simultaneously or if a non-registering group code is received. If two or more stations start sending simultaneously the station sending the highest group selection code causes all other stations to lockout until reset by the dispatcher's office. Also causes lockout of equipment if equipment attempts to send or receive more impulses than can be registered on the counting chain. |
| 525 | -------- | Alarm Relay—Operates the alarm and the alarm lamp. |
| -------- | 800, 860 | Time Delay Relay—Operates in cascade during a reset operation to delay the sending relays at the Remote Location and allow the Control Location to cut in and perform an operation. These relays are of the extra-slow release type. |
| 670 | 1090 | Group Stop Relay—Stops the impulsing when the correct number of impulses has been sent in the group selection code. |
| 660 | 1080 | Group Code Relay—Locks up the selected group. |
| 650 | 1070 | Group Check Relay—Stops the impulsing when the correct number of impulses has been sent in the group check code. |
| 640 | 1060 | Point Stop Relay—Stops the impulsing when the correct number of impulses has been sent in the point selection code. |
| 630 | 1050 | Point Code Relay—Locks up the selected point. |
| 624 | 1040 | Point Check Relay—Stops the impulsing when the correct number of impulses has been sent in the point check code. |
| 605 | -------- | Battery Supervision Relay—Normally held energized and releases only when the control power is shut off, operates the reset relay when power is turned on again. |
| 322, 326 | 875, 880 | Start Relays—Operate at the originating end to mark that end as the original starting end. |
| 315 | 870 | Start Relay—Operates at the end conditioned in the receiving state for the present transmission. |
| 310 | 865 | Check Back Relay—Operates to reset the equipment when, in response to a previously transmitted selection code, a different check code is received. |
| 550, 560 | 1130–1140 | Group Selection Control Relays—Operate on termination of an incoming group selection code to connect the counting chain contacts to the coils of the group selection relays. |
| 530, 540 | 1110–1120 | Point Selection Control Relay—Operates on termination of an incoming point selection code to connect the counting chain contacts to the coils of the point selection relays. |
| 280 | -------- | Supervision Control Relay—Operates on termination of an incoming supervision code to connect the counting chain contacts to the coils of the indication control relays. |
| Chain Relays 215–260 | 915–960 | Impulse Counting Chain Relays—Chain relays operate on successive operations of the line relays to count the impulses. Sequence relays operate in succession as the line relays are de-energized after each impulse to cause the counting relays to operate in sequence. |
| 500 | -------- | Check Relay—Operate when check key is operated to cause equipment to send check code of one impulse. |
| 505 | 1100–1105 | Master Check Relay—Relay 1105 operates in response to master check code to cause release of all H relays. Relay 1100 at the substation and relay 505 at the dispatcher's office serve as point selection relays on master check. |
| 510, 610, 620 | -------- | Operation Code Control Relays—Operate to cause equipment to send operation control codes. Relay 620 alone sends trip code—3 imp. Relays 510 and 620 together send close |

| Control Location, Figs. 1-6 Relay | Substation, Figs. 7-12 Relay | Function |
|---|---|---|
| | | code—5 imp. Relay 610 stops the impulsing when the correct number of impulses has been sent. |
| | 1020-1030 | Supervision Code Control Relays—Relay 1030 starts transmission of supervision code. Relay 1020 stops the impulsing when the correct number of impulses have been sent. |
| 515 | | Indication Agreement Relay—Operates to initiate reset of equipment after the supervision code has been recorded. |
| | 970 | Indication Control Relay—Controls the number of impulses to be sent in the supervision code. Released sends three impulses, operated five impulses. |
| 520 | | Anti-Recycling Key—Operates when master control key is held operated until after supervision is received to hold the point selection for further operations and prevents recycling of equipment until control key is released. |
| 600 | 845 | Reset Control—Initiates and terminates the long reset impulse. Relays 600 and 845 operate in conjunction with 850 and 855 to reset substation upon receipt of transient impulses. |
| 390 | 840 | Reset Relay—Operates under control of line relay to energize the auxiliary positive bus and releases to drop all relays being held by this bus. |
| 270 | | Aux. Supervision Control—Operates upon receipt of a supervision code in disagreement with the position of the point indication relay. Causes point indication relay to change position and operates alarm relay 525. |
| | 1095, 1098 | Time Delay Relays—Operate after a control operation to prevent the immediate release of the control MS relays in order to insure complete operation of controlled device. |
| 300, 303 | 850, 855 | Preliminary Protective Pulse Termination Relays—Operate at the end of the preliminary protective pulses and transfer counting chain to normal counting sequence position. |
| 685, 690, 696, 698 | | Line Supervision Relays—Relay 685 (high resistance) is held operated in series with the line relays which are non-operated, from current supplied at the substation, supervising the line. Releases upon an open-line condition or upon a minimum leakage. Relays 690 and 695 control alarms. Relay 698 operates from the alarm key and cuts off the audible alarm. |
| 791, 794 | | Guard Relays—Operate after the point selection key is operated to guard against the possibility of more than one point, code being set up. Relay 791 is point guard and relay 794 is group guard. |
| 290, 295, 297 | | Flashing Alarm Relays—Operate when an automatic change of indication is recorded to cause indication lamp to flash on associated escutcheon. |
| 700, 790 | | Point Start Relay—Operate when selection keys are operated to cause the proper point selection code to be sent. |
| 715, 745 | 1190, 1177 | Group Start Relays—Operate when selection keys are operated or when H relays drop to cause the proper group selection code to be sent. |
| 420, 450 | 1150, 1180 | Group Selection Relays—Operate in response to group selection code to prepare the operating circuits for the ten associated point selection relays. |
| 135, 190 | 1200, 1215 | Point Selection Relays—Operate in response to the point selection code to close the individual control and indication circuits. |
| 130, 180 | 1220, 1235 | Point Indication Relays—Operate and release under control of the breaker auxiliary switch to indicate position of the device. |
| 124, 170 | | Point Flashing Alarm Relay—Operates on an automatic change of indication to cause indication lamp to flash. |
| | 1240, 1270 | Automatic Point Start Relay—Normally energized and releases each time the associated device changes position to cause the change of indication to be transmitted to the dispatcher's office. |
| | 1292 | Metering Relay—Operates upon arrival at a metering point to connect metering source to telemetering transmitter. |

*Explanation of codes*

All operations are performed by alternate transmission of codes between the control station equipment and the substation, the sequence of the codes when an operation is performed by the operator at the control station being as follows:

| | Control Location Transmits | Remote Location Transmits |
|---|---|---|
| 1 | Group Selection Code | |
| 2 | | Group Check Code. |
| 3 | Point Selection Code | |
| 4 | | Point Check Code. |
| 5 | Operation Code | |
| 6 | | Supervision Code. |
| 7 | Reset Code | |

When the remote location reports as operation to the control location, the codes are transmitted as follows:

| | Control Location Transmits | Remote Location Transmits |
|---|---|---|
| 1 | | Group Selection Code. |
| 2 | Group Check Code | |
| 3 | | Point Selection Code. |
| 4 | Point Check Code | |
| 5 | | Supervision Code. |
| 6 | Reset Code | |

The reset code always consists of one long impulse. The close control code is always transmitted by the control equipment and comprises a series of five impulses. The trip control code is always transmitted by the control equipment and comprises a series of three impulses. The indication code transmitted by the substation comprises a series of five impulses when the circuit breaker is closed and three impulses when open.

*Remote control selection and operation*

A more thorough understanding of the apparatus of the invention will now be had with reference to the drawings and the following detailed description of the functions of the equipment shown thereat, responsive to the operation of a selection key on the control board at the control station. A "ground" symbol is used in the diagrams to indicate positive battery. Also it is noted that the first digit of the identification numbers for the various elements are indicative of the figure in which the element appears.

With the control office and substation equipment in their normal restored conditions, positive and negative battery are applied by the substation to the signalling channel over a circuit extending from positive battery over resistance 1018, contacts 1011, the winding of line relay 1000, contacts 1014, C85, contacts 666, the winding of line relay 680, the winding of line supervisory relay 685, C31, contacts 325b, C30, resistor 659, contacts 669, C86, contacts 1012, C1361, contacts 888, contacts 873, resistance 872' to negative battery. The circuit characteristics are calculated so as to normally supply energizing current of approximately 2 milliamperes over the signalling channel. Line relays 680 and 1000 are low resistance relays which operate on approximately 6 milliamperes, whereas the line supervision relay 685 is a high resistance relay which operates at approximately 1½ milliamperes. It will be apparent, therefore, that the line supervision path and signalling paths are normally connected in parallel and that the line relays 680 and 1000 will be normally restored and the line supervision relay 685 will be normally operated. Line supervision relay 685 at its contacts 686 completes an obvious operating circuit for associated relay 695 and this relay is, therefore, also normally operated.

Battery supervision relay 685 is normally energized over a circuit extending from battery over the winding of relay 685 and contacts to ground, and reset relay 390, which is of the slow-to-release type, is normally operated over a circuit extending from battery over the winding of reset relay 390 and contacts 682 to ground. The remaining relays in the control station are normally in the restored condition.

At the substation the line supervision path and signalling path (see Fig. 14) are connected in parallel and battery potential is connected to the line supervision path. Reset relay 840 is normally operated over a circuit extending from battery over the winding of the relay 840, and contacts 1002 to ground. Also, each of the automatic point start relays 1240 to 1270 inclusive are in the operated position, the circuit for relay 1270, for instance, extending from battery over contacts 1238, the winding of relay 1270, contacts 1239′, resistor 1247, contacts 1275′, C1292, contacts 1107, to ground. The remaining relays in the substation equipment are normally in the non-operated position.

It will be apparent from the designation on the drawing that the power supply source for certain of the relays at each of the stations is controlled by the reset relay thereat. That is, reset relay 390 at its contacts 392 controls the supply operating potential for each of the relays which is shown connected to a positive potential connection which is identified by an adjacent dot. Similarly, at the substation the relays marked in this fashion are controlled by power source normally completed by contacts 842 on reset relay 840. Thus, with restoration of either of these reset relays 390 or 840, the power supply to the local relays controlled thereby will be released.

*Line supervision*

Line supervisory relay 685 is normally maintained energized by the current supplied by the substation equipment. However, with the event of a short circuit of approximately ten thousand ohms, the current will be insufficient to hold the relay energized and the line supervisory relay 685 will restore and at its contacts 686 will interrupt the energizing circuit for its associate relay 695, and at its contacts 687 will complete an operating circuit for auxiliary supervisory relay 690. Auxiliary relay 690 operates and at its contacts 691 completes an operating circuit over C5 for alarm lamp 415 to notify the attendant that the equipment is no longer in the normal condition. Auxiliary relay 695 at its contacts 697 also completes an operating circuit over C3 to the line supervision lamp 413 to notify the attendant that the line has failed. Positive potential is connected by relay 695 over contacts 697, and 699′, C2′, contacts 529, conductor 2, the winding of the alarm bell and negative potential to ring the alarm bell 414 whereby audio signalling is also accomplished.

The attendant operates the alarm key which in turn operates relay 698 over the following circuit: battery over the winding of relay 698, C4, contacts 401, C3, contacts 697 to ground. Relay 698 locks over resistor 689, contacts 699 and 697 to ground. The alarm bell is silenced with the opening of contacts 699′ by the operated relay 698. The attendant then takes the necessary steps to correct the mishap and to restore the line supervision equipment by removal of the cause.

It should be noted that when relay 690 releases for any reason, relay 695 is released or operates according to whether ground through contacts 318 or 328 is present on lead 22 or appears on lead 22 before the slow-to-release period of relay 695 expires.

*Operation of the equipment at the dispatch office on selection for control or telemetering purposes*

A. *Initiating equipment operation.*—The operation of the equipment at the dispatch office responsive to operation of a selection key at the control board to select a circuit breaker associated with a given point at the remotely disposed substation will now be described.

As previously pointed out, each of the control board selection keys is individual to a given point or circuit breaker located at the substation, and the operation of the key effects the transmission by the control or dispatch office equipment of a given coded signal which is assigned to the associated circuit breaker at the remote point. With reference to Figure 1, for example, the selection key 120 is arranged to control the operations of the circuit breaker associated with point 12 at the substation. As previously pointed out, point 12 is associated with group 2 and is the second point of the second group. Therefore, selection key 120, which is assigned to that circuit breaker, must be arranged to control transmission of an identifying signal comprising two impulses for the selection of the proper group and subsequently two impulses for selecting the proper point.

Assuming now the operation of selection key 120 by the attendant with the equipment at both stations in the restored condition, contacts 121 will be closed by the key to complete an operating circuit for the group start relay 725, which extends from battery through resistor 798 over contacts 795, contacts 729′, the winding of the group start relay 725, C462, contacts 121 and C89 to positive battery.

A plurality of group start relays 715, 725, etc., inclusive, are each designed to represent one of the ten groups and are arranged to energize whenever a selection key associatd with its assigned group is operated. Thus, group start relay 725 which is assigned to represent the second group, operates with energization of selection key 120, which is associated with point 12 (second group, second point), and at its contacts 728 completes a self-holding circuit and a series operating circuit for a group guard relay 794, which is operative to prevent the simultaneous setting up of more than one group code. The operating circuit for the guard relay 794 extends from battery over the relay winding, contacts 729, the winding of group start relay 725 and contacts 728 to ground. Group guard relay 794 operates and at its contacts 795 opens a point in the operating circuits for each of the group start relays 700 to 790, inclusive, to prevent the operation of further group start relays during the selection period presently being accomplished.

A plurality of point start relays 700–790, inclusive, are each assigned to represent one of the ten points of each group and each is arranged to operate when a selector key associated with its assigned point designation is operated. Thus, in operating the selector key 120 (which is associated with point 12, the second point of the second group), an operating circuit for the second point start relay 710 is completed, the circuit therefore extending from battery through resistor 799 over contacts 792, contacts 714′, the winding of the point start relay 710, C463, and contacts 120′ to ground. The second point start relay 710 operates and at its contacts 713 completes a series operating circuit for point guard relay 791 and itself, which extends from battery over the winding of the point guard relay 791, contacts 714, the winding of the point start relay 710 and contacts 713 to ground. Point guard relay 791 operates and at its contacts 792 opens a point in the operating circuit for each of the point start relays 700–790, inclusive, to prevent the operation of any other of the point start relays until such time as the present selecting operation is completed. It is apparent from the foregoing that the desired group and point digits have now been recorded in the equipment at the control station.

B. *Conditioning equipment for signal transmission.*—With the accomplishment of a supervisory operation, one of the stations initiates the control while the other station receives, checks and operates. Conditioning of the control station equipment to effect an outgoing operation and the sending of controlling impulses is effected with the energization of a pair of outgoing start relays 322 and 326. Inasmuch as an outgoing operation is now being initiated, an energizing circuit is completed for the outgoing start relays 322 and 326 (see Fig. 3) by the point guard relay 791, the operating circuit for the start relays extending from battery over the windings of the start relays 322 and 326, respectively, C16, contacts 793 and 796, C17 and contacts 320 to ground.

Start relay 326 operates and at its contacts 329 completes an obvious self-holding circuit for both of the outgoing start relays to maintain same operated until reset of the equipment is accomplished following completion of the circuit breaker operation. Start relay 322 operates and at its contacts 325B opens a point in the previously described operating circuit for the line supervisory relay 685 to effect the release thereof and at its contacts 325A prepares a point in the parallel metering path. At this time therefor only the signaling path has potential applied thereto. Line supervision relay 685 releases and at its contacts 687 operates its associated auxiliary relay 690 to illuminate the alarm lamp 415 in the manner previously described which indicates that the control station equipment is in the off-normal condition. Relay 695 is held operated at contacts 328. Outgoing start relay 322 in operating also closes its contacts 335 to complete an operating circuit for the sending control relay 360, which circuit extends from battery over the winding of the sending control relay 360, contacts 311, contacts 334, contacts 325C, C32, contacts 674 to ground.

C. *Impulse transmission.*—The line relays at each station are arranged in operating relation with an impulse sending relay to effect a so-called "pumping" arrangement in which a series of impulses are automatically transmitted over the line conductors until positive action is taken to terminate the energizing circuit for the pumping arrangement at the control station.

The sending control relay 360 now operates and at its contacts 363 connects the initial operating ground to the control station impulse sending relay 665, to energize the impulse pumping arrangement thereat, the circuit therefor extending from battery over the winding of the impulse sending relay 665, contacts 604, contacts 684, conductor 35, contacts 363, contacts 311, contacts 374, contacts 325C, conductor 32, contacts 674 to ground. Additionally, the sending control relay 360 at its contacts 361 completes obvious operating circuits for auxiliary sending drive relays 340 and 350 which are maintained operated until the code transmission is completed and then deenergized to terminate the sending condition of the equipment. Drive relay 350 at its contacts 352 opens a point in the local metering path for the duration of the signal transmission.

Impulse sending relay 665 operates over the aforedescribed path and at its contacts 667 and 668 completes an operating loop for the local line relay 680 and the line relay 1000 at the sub-station, the local circuit extending from positive battery through resistor 658, over the contacts 668, rectifier 664, dispatch office line relay 680, resistance 674, contacts 667 and resistor 657 to negative battery. The operating circuit for substation line relay 1000 extends from positive battery through resistor 658 over contacts 668, line conductor 86, rectifier 1006, sub-station line relay 1000, contacts 1014, line conductor 85, contacts 667 and resistor 657 to positive battery.

The operation of the impulse pumping arrangement will be described hereat for purposes of clarity and brevity, further repeated description hereinafter being deemed unnecessary. Line relay 680 operates and at its contacts 684 interrupts the operating circuit for the impulse sending relay 665 which being of the slow released type will responsively restore after a short interval and at its contacts 667 and 668 interrupts the energizing circuit for the line relays 680 and 1000. Thus the length of pulses is mainly determined by the restoring time of the slow-to-release relay 665. Line relays 680 and 1000 restore and line relay 680 at its contacts 684 re-establishes the operating circuit for the impulse sending relay 665 which reoperates to reenergize line relay 680. The cycle is thereupon reinitiated and the operation of the arrangement continues until the energizing circuit for the impulse sending relay 665 is interrupted at another point.

It should be observed that the pulsing of line relay 680 effects intermittent opening and closure at contacts 682 of the circuit of reset relay 390, which being of the extra-slow-to-release type does not release during regular pulsing. Restoration thereof is accomplished as hereinafter described by the transmission of a pulse having an extra long break period.

Referring now to the first operation of the line relays 680 and 1000, it is noted that line relay 680 closes its contacts 683 to complete a second energizing circuit for the sending control relay 360 which extends from battery over the winding of sending control relay 360, contacts 363, conductor 35, contacts 683 to ground.

Each of the stations includes a series of relays arranged in the manner of the conventional telephone counting chain arrangements which are operative in sequence to resister the code signal being transmitted or received. Line relay 680 in its first operation at its contacts 681 completes an operating circuit for the first relay 215 of the impulse counting chain at the control office which extends from battery over the winding of relay 215, contacts 213, 208, 204, C368', contacts 338, C38 contacts 282, C38, contacts 391, C40, and contacts 681 to ground.

The first counting chain relay 215 operates and at its contacts 217 prepares a series operating circuit for the first sequence relay 210 for the counting chain, the circuit extending from battery over the first counting chain relay 215, contacts 217, sequence relay 210, contacts 206, C369, and contacts 351 to ground. The sequence relay, however, is inoperative by reason of the shunt imposed by the original operating circuit for the counting chain relay 215.

The control station equipment has at this point initiated transmission of the circuit protective pulses and the local registration thereof.

D. *Sub-station operation.*—The aforedescribed circuit operations are effected at the control station without influence on the sub-station equipment. However, with the first energization of the line relays 680 and 1000, the sub-station equipment is immediately conditioned for receipt of an incoming set of signal pulses.

Specifically, line relay 1000 in operating is effective at its contacts 1001 to complete an operating circuit for a receiving relay 835 which extends from battery over the winding of relay 835, contacts, 813, 823, 843, C1366 and contacts 1001 to ground. The receiving relay is of the slow-to-release type and remains operated for the period that the incoming set of protective and group selection impulses are received. It should be observed that the pulsing of line relay 1000 intermittently opens and closes the circuit of reset relay 840 at contacts 1002 but said relay, being of the extra-slow-to- release type does not release during regular pulsing, requiring a longer open period, i. e. the reset pulse as explained hereinafter, to be released.

The sub-station equipment also includes a counting chain unit which is operative to record the signals transmitted over the channel and line relay 1000 is operative in its first energization to complete an energizing circuit for the first counting chain relay 915 which extends from battery over the winding of the first chain relay 915, contacts 912, 907, 902, C1303, contacts 808, contacts 843, contacts 1001 to ground.

The first counting chain relay 915 operates to complete a series operating circuit for the first sequence relay 910 of the counting chain, which circuit extends from battery over the winding of counting chain relay 915, contacts 918, the winding of the sequence relay 910, contacts 909, C1304, contacts 809, contacts 814, C1357, and contacts 1083 to ground. Sequence relay 910 is inoperative by reason of the shunt imposed thereon by the original operating circuit for the counting chain relay 915.

An incoming start relay located at each station is arranged to operate on receipt of an incoming set of impulses to condition the equipment for the duration of the receipt of such set. Counting chain relay 915 in operating is effective at its contacts 916 to complete an operating circuit to the substation incoming start relay 870 at this time, the circuit extending from battery over the winding of the start relay 870, C1310, contacts 916, C1309 and contacts 883 to ground. Start relay 870 operates and at its contacts 871 completes an obvious self-holding circuit to ground, and at its contacts 873 interrupts the line supervision path locally, the circuit having been previously interrupted at the control station by contacts 325b. Relay 870 at its contacts 872 prepares the metering path for parallel connection with the signalling path immediately following selection of the desired point. The substation equipment is now prepared to receive the impulse series from the control office.

Summarily, it is noted that the operation of selection key 120 has therefore effected registration of the group, and point selection digits at the control station, has effected the operation of the line relays 680 and 1000, has placed the sub-station in the receiving condition and the control station in the sending condition, has initiated the operation of the impulse pumping arrangement, has prepared the telemetering circuit for operation following point selection, and has signalled the attendant that such operations are proceeding.

As will be hereinafter explained, the equipment at each station in its normal condition is electrically locked in a manner whereby the counting chain relays are operative responsive to receipt of transient pulses, but are ineffective to operate any of the controlled equipment, such as the sub-station circuit breakers. The counting chains are rendered selectively operative only by the transmission of a given set of key or compensating protective impulses.

It should be noted that in the present embodiment the first three impulses transmitted are compensating protective pulses which, when prefixed to the group selection digit, unlock the equipment to permit response of the counting chain to the active group selection digit.

Referring once more to the equipment at the control office, it will be recalled that with the operation of line relay 680 thereat, contacts 684 were operated to interrupt the operating circuit for the impulse sending relay 665 to thus continue the first pumping cycle. Relay 665 accordingly restores after a brief time period and at its contacts 667 and 668 interrupts the energizing circuit for the line relays 680 and 1000 at the respective stations. Line relay 680 restores and at its contacts 681 interrupts the initial energizing circuit for counting chain relay 215 to remove the heretofore described shunt circuit for the sequence relay 210. Sequence relay 210 now operates in series with the first counting chain relay 215 over the prepared series circuit heretofore described.

Line relay 1000 at the substation is released with line relay 680 and with the opening of the contacts 1001 responsive to release of the line relay 1000, the initial energizing circuit for counting chain relay 915 and the shunt circuit for sequence relay 910 is opened. Sequence relay 910 now operates in series with the first counting chain relay 915 over the prepared circuit heretofore described.

Sequence relay 910 in operating is effective to close its contacts 911 to complete an operating circuit for the receiving control relay 830 for the substation, which circuit extends from battery over the winding of the receiving contact relay 830, conductor 1306, contacts 911, conductor 1305, contacts 838 of the receiving relay to ground. Receiving control relay 830 operates and at its contacts 832 completes an obvious operating circuit for an auxiliary control relay 825.

It is to be noted at this time that the receiving relay 835 is slow-to-release and accordingly remains operated for the duration of the presently received impulses. The metering circuit is thus maintained open at contacts 836 for the period that impulses are being transmitted by the control station. Additionally, auxiliary receiving control relays 825 and 830 are adapted to be maintained energized by the counting chain sequence relays until the impulses have terminated and group selection has been made. Subsequent to the selection the receiving relays 825, 830 and 835 are restored to terminate the receiving condition of the equipment.

Briefly then, after the break portion of the first impulse is received by the line relays 680 and 1000, a first counting chain relay and a first sequence relay at each of the stations are maintained energized by series operating circuits.

It is apparent that with the restoration of the line relay 680, contacts 684 are reclosed to recomplete the operating circuit for the impulse sending relay 665. Impulse sending relay 665 once more reoperates, and at its contacts 667 and 668 effects reclosure of the energizing circuit for the line relays 680 and 1000 at the respective stations. Thus, one pumping cycle has been completed and a new cycle started.

As control station line relay 680 reoperates a second time it is effective at its contacts 681 to complete an operating circuit for the second counting chain relay 220 over a circuit extending from battery over the winding of relay 220, contacts 218, contacts 213, contacts 208, contacts 204, C368′, contacts 338, C38, contacts 282, C39, contacts 391, C40 and contacts 681 to ground. Counting chain relay 220 operates and at its contacts 223 prepares a series operating circuit for the second sequence relay 205, such series circuit extending from battery over the winding of the second counting chain relay 220, contacts 223, winding of relay 205, contacts 202, C369, and contacts 351 to ground. Sequence relay 205 is prevented from operating, however, by the shunt arrangement effected by the initial operating circuit for the second counting chain relay 220.

A similar circuit operation occurs at the substation with the operation of the line relay 1000, the closing of its contacts 1001 being effective to complete an operating circuit for the second of the counting chain relays thereat, the circuit extending from battery over counting chain relay 920, contacts 917, contacts 913, 907, 902, C1303, contacts 808, 843, C1366 and contacts 1001 to ground. The counting chain relay 920 in operating prepares a circuit for the second sequence relay 905, which circuit extends from battery over counting chain relay 920, contacts 922, sequence relay 905, contacts 904, C1304, contacts 809, 814, C1357, contacts 1083 to ground. The sequence relay, however, is prevented from operating by the shunt imposed thereupon by the initial operating circuit for the second chain relay 920. Summarily then, responsive to the second energization of the series line relays 680 and 1000, the first and second counting chain relays and the first sequence relay at each station have been operated and the second sequence relay at each station is prepared.

As the pumping operation of the arrangement at the dispatch office continues, the line relays 680 and 1000 are released for the second time and line relay 680 at its contacts 681 interrupts the original energizing circuit for the counting chain relay 220 to remove the shunt for sequence relay 205, which immediately energizes in series with the second counting chain relay 220 over the described circuit. Sequence relay 205 at its contacts 206 interrupts the energizing circuit for the first sequence relay 210 and the first counting chain relay 215 to effect the restoration thereof.

The simultaneous release of the line relay 1000 at the substation effects the opening of contacts 1001 and the interruption of the shunt circuit for the second sequence relay 905 to effect the immediate operation thereof in series with the second counting chain relay 920. Sequence relay 905 in operating is effective at its contacts 909 to interrupt the operating circuit for the first sequence relay 910 and the first counting chain relay 915 to effect restoration thereof.

The pumping operation continues and line relay 680 and line relay 1000 are energized a third time. Line relay 680 at the dispatch office is operative at its contacts 681 to complete an operating circuit for the third counting chain relay 225, which extends from battery over the winding of relay 225, contacts 224, contacts 207, contacts 204, C368', contacts 338, C38, contacts 282, C39, contacts 391, C40, and contacts 681 to ground. The third counting chain relay 225 operates and at its contacts 228 prepares an operating circuit for the third sequence relay 200, which extends from battery over the counting chain relay 225, contacts 228, the winding of sequence relay 200, contacts 211, C369 and contacts 351 to ground. The sequence relay is held inoperative, however, by the shunt which is imposed thereon by the initial operating circuit for the counting chain relay 225.

In a similar manner, with the third energization of the line relay 1000 at the substation, the third counting chain relay 925 is operated over a circuit which extends from battery over the winding of counting chain relay 925, contacts 921, contacts 908, contacts 902, C1303, contacts 808, 843, C1366, contacts 1001 to ground. Counting chain relay 925 operates, and at its contacts 928 prepares an operating circuit for the third sequence relay 900 which extends from battery over counting chain relay 925, contacts 928, sequence relay 900, contacts 914, C1304, contacts 809, 814, C1357, and contacts 1083 to ground. Sequence relay 900 is held inoperative by the shunt imposed thereon by the original energizing circuit for the counting chain relay 925.

With the third release of the line relays 680 and 1000 as the pumping action of the arrangement at the control office continues, line relay 680 at its contacts 681 opens the original energizing circuit for the counting chain relay 225 and operation of the third sequence relay 200 is effected. Sequence relay 200 operates and at its contacts 202 interrupts the energizing circuit for the second counting chain relay 220 and the second sequence relay 205, which accordingly restore.

With the operation of the third counting chain relay 225 and the third sequence relay 200, the three compensating protective pulses have been registered at the control station and the counting chain may now be arranged to respond to the group digit which is about to be transmitted. The transfer of the counting chain to receive the group digit is effected by the set of so-called "preliminary protective pulse terminating" relays 300 and 303. Energization of these transfer relays is now effected by the third sequence relay over a circuit which extends from battery over the winding of relay 300, contacts 304, C355, contacts 226', contacts 201, C369, contacts 343, C36, contacts 662 to ground. Preliminary protective relay 300 operates and at its contacts 301 prepares a circuit for auxiliary transfer relay 303, which is now shunted by the operating circuit for the first protective relay 300.

Similarly, with the third release of the line relay 1000 in the substation contacts 1001 are opened to interrupt the shunt circuit for the third sequence relay 900 to thereby effect the operation thereof in series with the third counting chain relay 925. Sequence relay 900 at its contacts 904 is operative to interrupt the holding circuit for the second sequence relay 905 and the second counting chain relay 920 to effect restoration thereof.

Sequence relay 900 and counting chain relay 925 in operating are also effective at their contacts to close an operating circuit for a preliminary protective pulse terminating relay 850 thereat which in operating unlocks the equipment by conditioning the counting chain system for registration of the group selection digit about to be received. The operating circuit extends over battery winding or relay 850, contacts 858, C1314, contacts 926, contacts 904', C1364, contacts 809, 814, C1357 and contacts 1083 to ground. Relay 850 in operating is effective at its contacts 851 to prepare a series operating circuit for an auxiliary protective relay 855 which is inoperative at the present time by reason of the shunt imposed by the original operating circuit for the protective relay 850. Summarily, with the third release of the line relay, the third counting chain and third sequence relays at each station are operated and the preliminary protective pulse terminating relays thereat are operated to condition the equipment for receipt of the functional impulses.

As the pumping operation continues, the relay 680 and line relay 1000 at the respective stations are operated a fourth time and line relay 680 at its contacts 681 effects the re-operation of the first counting chain relay 215 over a circuit extending from battery, first counting chain relay 215, C356, contacts 306, C359, contacts 229, contacts 203, C368', contacts 338, C38, contacts 282, C39, contacts 391, C40 and contacts 681 to ground. Counting chain relay 215 operates and prepares a series operating circuit with the first sequence relay 210 in the manner heretofore described. Sequence relay 210, however, is maintained inoperative at the present time by reason of the shunt imposed thereon by the operating circuit of the counting chain relay 215.

In a similar manner, the operation of the line relay 1000 at the substation is effective to close contacts 1001 to complete a circuit for again operating the first counting chain relay 915, the circuit extending from battery over the winding of counting chain relay 915, C1307, contacts 859', C1312, contacts 927, contacts 903, C1303, contacts 808, 843, C1366, and contacts 1001 to ground. The first counting chain relay 215 in operating prepares a series operating circuit with the first sequence relay 910 as heretofore described, which is ineffective at the present time by reason of the shunt imposed thereupon by the completed operating circuit for the counting chain relay 915.

As the impulse pumping continues to effect the fourth release of the respective line relays 680 and 1000, the control station line relay 680 at its contacts 681 opens the shunt circuit for the first sequence relay 210 to effect operation thereof. Sequence relay 210 operates and at its contacts 211 opens the energizing circuit for the third counting chain relay 225 and the third sequence relay 200, which responsively restore. Sequence relay 200 and counting chain relay 225 in releasing interrupts the shunt circuit for the second protective relay 303 and protection relay 303 thereupon operates over the series circuit prepared by associated protective relay 300.

In a similar manner, as the line relay 1000 is de-energized for the fourth time at the substation, contacts 1001 are opened to effect removal of the shunt on the first sequence relay 910, which relay accordingly operates and at its contacts 914 opens the holding circuit for the third counting chain relay 925 and the third sequence relay 900 to restore same. Sequence relay 900 and counting chain relay 925 at their contacts 926 and 903 interrupt the shunt circuit for the protective relay 855 to effect the operation of the two protective relays 850 and 855 in series over an obvious circuit.

As the control station continues the impulse transmission, line relays 680 and 1000, respectively, are operated for the fifth time, and line relay 1000 effects the completion of a circuit for the second counting chain relay 920 which operates and prepares a series operating circuit for its associated sequence relay 905 in the manner heretofore described. Control station line relay 680 at its contacts 681 completes an operating circuit for the second counting chain relay 220 which extends from battery over the counting chain relay 220, contacts 218, 212, 208, 204, C368', contacts 338, C38, contacts 282, C39, contacts 391, C40, and contacts 681 to ground. The second counting chain relay 220 operates and at its contacts 222 completes an operating circuit for the group stop relay 670, which circuit was previously prepared in the registration of the group selection digit "2" by the operation of selection key 120.

Group stop relay 670, as its name indicates, is arranged to terminate the operation of the pumping arrangement when the number of impulses corresponding to the registered group digit have been transmitted. Inasmuch as the equipment has been unlocked by the three compensation pulses and the registered group digit 2 has been transmitted, the groups stop relay 670 operates over a circuit which extends from battery over the winding of relay 670, contacts 672, C19, contacts 323, C18, contacts 716, contacts 727, C7, contacts 222, 226, 231, 236, 241, 246, 251, 256, 261, C364, contacts 302, contacts 372 and contacts 331 to ground. Group stop relay 670 locks up over an obvious self-holding circuit which extends over contacts 671 to ground. Group stop relay 670 at its contacts 674 also opens one of the energizing circuits for the sending control relay 360.

As the line relay 680 now restores for the fifth time, it is effective at its contacts 683 to open the second holding circuit for the sending control relay 360, thus effecting release thereof to terminate the impulse transmission. Specifically, sending control relay 360 at its contacts 363 opens the operating circuit for impulse sending relay 665 and the relay is restored to end the transmission of impulses for the present. Sending control relay 360 at its contacts 361 opens the operating circuits for the sending control relays 350 and 340 to effect the release thereof. Sending control relay 350 restores, and at its contacts 351 interrupts the holding circuit for the second counting chain relay 220 and the second sequence relay 205 to restore same. Sending control relay 350 at its contacts 352 recompletes a point in the metering path. Relay 340, being of the slow-to-release type, holds the circuit to ground through contacts 343 open for a time period which is sufficient to permit relays 220 and 205 to release.

Referring now to the equipment at the substation, with the fifth and final release of the line relay 1000, the second sequence relay 905 operates in series with the counting chain relay 920 over the prepared series circuit. Further, in response to the termination of the impulse transmitting operations at the control station, the line relay 1000 will be maintained inoperative for a comparatively long period of time, and the energizing circuit for the receiving relay 835 will be interrupted by open contacts 1001 for an interval of time which is sufficient to effect the restoration thereof. Receiving relay 835 restores and at its contacts 836 completes a point in the metering path, which is still inoperative however pending selection of a point in the substation.

It is evident that a group selection should now be made which corresponds to the value of the group digit received. Receiving relay 835 in restoring is therefore also effective at its contacts 837 and its contacts 839' to complete an operating circuit for group selection control relays 1130 and 1140, which circuit extends from battery over the respective windings of the relays 1130 and 1140, C1349, contacts 1071, 1061, C1364, contacts 857, 839', 833, C1355, contacts 1035, C1360, contacts 837 to ground. The group selection control relays 1130 and 1140 operate and lock themselves to ground over the contacts 1136, C1350, contacts 1076, C1353, contacts 874. Operations of the group selection control relay 1130 in turn effects the operation of group selection relays 1170 and 1180, which in their operation represent the receipt of a group selection digit for the second group. The energizing circuit extends from battery to windings of the respective group selection relays 1170 and 1180, contacts 1132, C1328, contacts 923, 929', 934, 939, 944, 949, 954, 959, 964, C1311, contacts 852 and 827 to ground, it being apparent therefrom that the operated one of the counting chain relays is effective to determine the group selection relay to the operated.

Group selection relays 1170 and 1180 operate, and relay 1170 at its contacts 1176 completes an operating circuit for the group code relay 1080, which circuit extends from battery over the winding of relay 1080, C1348, contacts 1176, contacts 1132, the counting chain relay contacts 923, 929', 934, 939, 944, 949, 954, 959, 964, C1311, contacts 852 and contacts 827 to ground.

It is important, of course, that the selected group be maintained energized for the final selection period, but it is also necessary to have a free counting chain system for translating the further supervisory signals which are used to accomplish point selection and, accordingly, a group code relay 1080 is provided for locking up the selected group relays. Group code relay 1080 now operates and at its contacts 1082 completes an obvious self-holding circuit and the desired holding circuit for the group selection relays 1170 and 1180. Group code relay 1080, at its contacts 1083, also opens the series holding circuit of the second counting chain relay 920 and the second sequence relay 905, which are responsively restored, whereby the counting chain is freed for further use. Sequence relay 905 in restoring is operative at its contacts 906 to effect the restoration of the receiving control relay 830. Receiving control relay 830 restores and at its contacts 832 effects the restoration of its auxiliary relay 825.

E. *Group check-back transmission.*—As previously pointed out, the serious nature of the consequence which result from improper operation of the equipment necessitates the provision of many extra safeguards. One of these safeguards comprises the transmission of a "check-back" signal to the control station, which is indicative of the group actually selected. Conditioning of the substation for such transmission is now initiated by the restoration of receiving control relay 825 which, at its contacts 826, completes an operating circuit for the sending control relay 820. The operating circuit extends from battery over relay 820, contacts 826, C1358, contacts 1081, 1073, 1063 to ground.

Sending control relay 820 operates and at its contacts 822 extends its operating ground to energize the sending relay 1010 over C1365, contacts 1004, C1369, contacts 846, C1368 and the winding of the relay 1010 to battery. Sending control relay 820 at its contacts 821 also effects the operation of the sending drive relays 815 and 810. Relay 810 at its contacts 811 interrupts a further point in the local metering path. The substation has now been converted from the receiving to the transmitting condition to initiate the check-back operation.

Sending relay 1010 operates and at its contacts 1013 and 1015 completes an operating circuit for the line relays 680 and 1000, the operating circuit for relay 1000 extending from positive battery through resistor 1013, over contacts 1013, rectifier 1006, line relay 1000, resistance 1007, contacts 1015, and through resistor 1015' to negative battery; the operating circuit for line relay 680 at the control office extending from positive battery through resistor 1013', over contacts 1013, line C86, rectifier 664, line relay 680, contacts 666, line C85, contacts 1015 and through resistor 1015' to negative battery.

Substation line relay 1000 operates and at its contacts 1004 interrupts the operating circuit for the impulse sending relay 1010 and at its contacts 1003 completes a holding circuit for sending control relay 820, which extends from battery over the winding of relay 820, contacts 822, C1365, contacts 1003 to ground.

Line relay 1000 at its contacts 1001 also completes an operating circuit for the first relay of the counting chain which extends from battery over counting chain relay 915, contacts 912, 907, 902, C1303, contacts 808, contacts 834, C1366 and contacts 1001 to ground. The counting chain relay 915 operates and prepares a series operating circuit for the first sequence relay 910 in a manner heretofore described, which relay is inoperative by reason of the shunt imposed thereupon by the completed operating circuit for the first counting chain relay 915.

As the group check-back signal is transmitted over the line conductors 85 and 86, the control station equipment must necessarily be placed in the impulse receiving condition and additionally in condition for receiving a check-back signal.

Referring then to the equipment at the control office, it is noted that responsive to receipt of the first energizing impulse from the substation, line relay 680 thereat operates over the loop circuit described, and at its contacts 681, effects the operation of the receiving relay 384 over a circuit extending from the battery over the winding of receiving relay 384, contacts 342, contacts 362, C38, contacts 282, C39, contacts 391, C40, contacts 681 to ground. Line relay 680, in operating, is also effective at its contacts 681 to complete an operating circuit for the first counting chain relay 215, which circuit extends from battery over the winding of relay 215, contacts 213, 208, 204, C368', contacts 338, C38, contacts 282, C39, contacts 391, C40, contacts 681 to ground. Counting chain relay 215 operates and prepares a series operating circuit for the first sequence relay 210, which is presently shunted by reason of the completion of the original operating circuit to the counting chain relay 215.

The receiving relay 384 operates, and at its contacts 387, completes an operating circuit to check-back relay 310, which circuit extends from battery through resistor 310' over the winding of relay 310, contacts 387, contacts 324, C24, contacts 614 to ground. Check-back relay 310 is arranged to reset the equipment when the returned check-back code is different than the digit transmitted. Check-back relay 310 operates and locks over an obvious self-holding circuit extending over contacts 313, contacts 324, C24, and contacts 614 to ground.

The dispatch office equipment is now conditioned for receipt of the group check signal which is to be automatically transmitted by the substation equipment. With reference to the equipment thereat, it will be noted that a pumping arrangement, such as the previously described control station arrangement, is now established at the substation by the impulse sending relay 1010 and the line relay 1000. Thus, with each release of relay 1010, the contacts 1013 and 1015 thereof are opened to interrupt the operating circuit for line relay 1000. Line relay 1000 releases and, at its contacts 1004, completes an energizing circuit for sending relay 1010. Sending relay 1010 then operates and, at its contacts 1013 and 1015, re-establishes an operating circuit for line relay 1000; line relay 1000 operates and, at its contacts 1004, interrupts the sending relay 1010 to cause it to restore. As previously pointed out, the operation of this arrangement has been initiated by the operation of the sending control relays thereat and the automatic transmission of impulses will be effected until interrupted by the equipment at the substation.

As the sending relay 1010 releases for the first time, the energizing circuit for the line relays 680 and 1000 are opened, and line relays 680 and 1000 restore. Restoration of the line relay 1000 effects the opening of its contacts 1091 and the removal of the shunt from the first sequence relay 910 to effect operation thereof in series with the first counting chain relay 915. Similarly, at the dispatch office, the release of the line relay 680 effects the opening of contacts 681 and the removal of the shunt circuit from the sequence relay 210. Sequence relay 210 responsively operates in series with first counting chain relay 215 over the circuit prepared thereby. Sequence relay 210 at its contacts 214 completes an operating circuit to the receiving control relay 380, which extends from battery over relay 380, C368, contacts 214, C369', contacts 385 to ground. The receiving control relay 380 operates and at its contacts 382 establishes a self-holding circuit which extends from battery over the winding of the relay 380, C368, sequence relay contacts 204', 209 or 214 (depending on which sequence relay is operated), C369' and contacts 382 to ground. Receiver control relay 380, at its contacts 381, completes an obvious energizing circuit for an auxiliary relay 370, which operates to open a point in the local metering path for the duration of the impulses.

As the pumping action of the substation arrangement continues, sending relay 1010 effects a second energization of line relays 1000 and 680. Line relay 1000 operates and at its contacts 1001 completes an operating circuit for the second relay of the counting chain, which extends from battery over relay 920, contacts 917, 913, 907, 902, C1303, contacts 808, 843, C1366, contacts 1001 to ground. Counting chain relay 920 operates and at its contacts 922 prepares a series operating circuit for the second sequence relay 905, which is presently held inoperative by reason of the shunt imposed thereacross by the initial operating circuit for the counting chain relay 920. The series operating circuit extends from battery over the winding of relay 920, contacts 922, sequence relay winding 905, contacts 904, C1304, contacts 809, and contacts 816 to ground.

Counting chain relay 920 at its contacts 923 completes an operating circuit for the group check relay 1070, which circuit extends from battery over the winding of group check relay 1070, contacts 1052, C1356, contacts 881, contacts 828, contacts 852, C1311, contacts 964, 959, 954, 944, 939, 934, 929', 923, C1328, contacts 1132, 1176, C1348 and contacts 1082 to ground. The group check relay is operative to terminate the check-back signal transmission at the proper time, and it is noted that the time of operation of the group check relay is determined by the particular group signal which has been registered on the group selection relays. In the present example, group 2 has been registered, and therefore group selection relay 1170 at this time effects operation of group check relay 1070 to terminate impulse transmission after the sending of two impulses. Group check relay 1070 operates and at its contacts 1075 completes a self-holding circuit which extends over C1353 and contacts 874 to ground. Group check relay 1070 at its contacts 1076 interrupts the holding circuit for the group selection control relays 1130 and 1140, which responsively release.

The second operation of the line relay 680 at the control station responsive to the incoming check-back signal effects the closure of contacts 681 and the operation of the second counting chain relay 220 over a circuit which extends from battery, the winding of relay 220, contacts 218, 208, 204, C368', contacts 338, C38, contacts 282, C39, contacts 391, C40, contacts 681 to ground. Counting chain relay 220 operates and at its contacts 223 prepares a series operating circuit for the second sequence relay 205, which extends from battery over the winding of the second counting chain relay 220, contacts 223, winding of sequence relay 205, contacts 202, C369, contacts 343, C36, contacts 662 to ground. The second sequence relay 205 is presently held inoperative by the shunt which is imposed thereupon by the initial operating circuit for the counting chain relay 220.

As the line relay 1000 and line relay 680 are released for a second time, line relay 1000 at its contacts 1001 interrupts the shunt circuit for the second sequence relay 905, which accordingly operates over the prepared circuit in series with the second counting chain relay 920. Sequence relay 905 in operating is effective at its contacts 909 to open the series holding circuit for the sequence relay 910 and the first counting chain relay 915 to effect the restoration thereof. The group check relay 1070, having operated during the previous energization of the line relay 1000 has opened one of the energizing circuits for the sending control relay 820 to prepare the release thereof with the following restoration of the line relay 1000, such interruption being accomplished by the opening of its contacts 1073. As the line relay 1000 now restores, contacts 1003 are opened and the second holding circuit for the sending control relay 820 is interrupted.

Sending control relay 820 releases and at its contacts 821 interrupts the operating circuits for the sending drive relays 810 and 815, respectively. Relay 815 releases and at its contacts 816 interrupts the holding circuit for the second sequence relay 905 and the second counting chain relay 920 to effect the restoration thereof. Relay 810 is of the slow-to-release type and holds its contacts 814 open for a time period sufficient to permit relays 905 and 920 to release. Relay 810 releases and recloses contacts 811 to recomplete a point in the local metering path. The transmission of pulses by the relay pumping arrangement at the substation is thus terminated after the transmission of a coded signal of two digits which is indicative of the particular group selected by the substation equipment.

With the second release of the line relay 680 at the control office responsive to the receipt of the check-back signal, the shunt is removed from the series circuit for the second counting chain relay 220 and the second sequence relay 205 to permit the series operation thereof over the prepared circuit. Sequence relay 205 is operative at its contacts 206 to interrupt the holding circuits for the first counting chain relay 215 and the first sequence relay 210 to effect the restoration thereof.

The prolonged release of line relay 680 as the result of the termination of the impulse transmission by the substation effects the restoration of the slow-to-release receiving relay 384 and the comparison of the transmitted group signal and the check-back group signals is effected. Assuming first that the proper check-back signal is received and relay 384 is released following termination of the impulses, contacts 386 are closed to complete operating circuits for the group selection control relays 550 and 560, the energizing circuit therefor extending from battery over the windings of the relays 550 and 560 over C56, contacts 656, contacts 646, C27, contacts 304', contacts 383, and contacts 386 to ground.

Group selection control relay 550, in operating, is effective at its contacts 552 to complete an operating circuit for the group selection relays 420 and 430 over a circuit which extends from battery over the windings of relays 420 and 430, C90, contacts 552, C7, contacts 222, 226, 231, 236, 241, 246, 251, 256, 261, C364, contacts 302 and contacts 371 to ground.

Group selector control relay 550, at its contacts 555, completes a shunt circuit for check-back relay 310 to effect the release thereof, the shunt circuit extending from battery over the 500 ohm resistance 310', C50, contacts 555, C57, C19, contacts 323, C18, contacts 716, 727, C7, contacts 222, 226, 231, 236, 241, 246, 251, 256, 261, C364, contacts 302 and contacts 371 to ground. Check-back relay 310 accordingly releases.

Group selection relay 430 operates and at its contacts 431 completes an operating circuit for group code relay 660 by extending its operating ground which appears on C90 over contacts 431, C54, to the winding of group code relay 660 and battery. Group code relay 660 operates and at its contacts 661 completes a self-holding circuit and a holding circuit for group selection relays 420 and 430. Group code relay 660 of its contacts 662 interrupts the holding circuit for the operated counting chain relay 220 and the operated sequence relay 205 which release. Relay 205 at its contacts 209 interrupts the holding circuit for the receiving control relay 380 to effect the restoration thereof.

Receiving control relay 380 releases and at its contacts 381 effects the release of auxiliary control relay 370. Receiving control relay 380 is also effective at its contacts 383 to interrupt the holding circuit for the group selection control relays 550 and 560 to effect the restoration thereof. Auxiliary control relay 370 restores and at its contacts 374 effects the operation of sending control relay 360 and at its contacts 373 recompletes a point in the local metering path.

In the event that a check-back digit other than the digit "two" is received by the control station, the counting chain will advance to a relay other than relay 220 and the aforedescribed operations will not be effected. For example, supposing digit "one" instead of digit "two" is returned, the counting chain will advance to the first relay and following termination of the impulse counting chain, relay 215 will be in the operated condition. As receiving relay 384 restores, the group selection relays 550 and 560 are responsively operated as described. Group selection relay 550 prepares the circuit for shunting the check-back relay 310, but such circuit is not completed in that the second counting chain relay is inoperative and its contacts 222 are held open. The circuit completed by contacts 216 moreover is interrupted by the open contacts 717 of the de-energized group start relay 715 and consequently the check-back relay 311 remains operated.

Thus, as the equipment operates as described above to eventually restores auxiliary control relay 370 and close contacts 374, the circuit to the sending relay for initiating the transmission of the point selection digit will be interrupted by the open contacts 311 of the check-back relay 310. In addition, to preventing operation of the sending control relay 360 to send the point selection digit, check-back relay 310 at its contacts 312 completes an operating circuit to reset relay 600, which circuit extends from battery over the reset relay winding, contacts 608, C29', contacts 312, 374, C33, contacts 663, 654 and 644 to ground. Reset relay 600 operates in the manner described hereinafter to restore both stations to the normal condition and to so inform the operator.

It is seen from the foregoing that unless the same sequential relay of the group start relays and the sequential counting chain relays are operated following receipt of the check-back signal, the equipment will be restored.

Summarily then, at this point it will be noted that if the group check signal transmitted by the substation is correct, the equipment at the dispatch station will accept the group check code and having determined the accuracy of the signal, will prepare to transmit the point selection code "2" was previously established as a result of the operation of the selector 120.

F. *Transmission of point selection code.*—In the event of agreement of the check-back signal, the selection of the second point in the second group is now accomplished by the transmission of the informing point selection digit "2." Sending control relay 360 is operated over the circuit extending from battery over the winding of the control relay 360, contacts 311, contacts 374, C33, contacts 663, 654, 644 to ground. Sending control relay 360 operates and extends its operating ground to the impulse sending relay 665, the energizing circuit extending over contacts 363, C35, contacts 684, contacts 604 and the winding of relay 665 to battery. The control office is now prepared to transmit the point selection code to the substation much in the manner that the group selection code was transmitted, with the exception that the code at this time is not preceded by the protective impulse series.

Sending control relay 360 at its contacts 361 completes obvious circuits for the sending drive relays 350 and 340. Sending drive relay 350 at its contacts 352 once more interrupts a point in the local metering path.

The control station impulse pumping arrangement is once more energized by the sending control relay 360 at its contacts 363 and line relays 680 and 1000 are energized to effect the first impulse of the point selection code. Line relay 680 is operative at its contacts 681 to complete the aforedescribed circuit to the first counting chain relay 215. Counting chain relay 215 operates in turn, and prepares a series circuit for the first sequence relay 210, which is presently shunted by the completed operating circuit for the counting chain relay 215.

At the substation, the first operation of the line relay 1000 in response to the point selection code is effective to close contacts 1001 and thereby effect the operation of the receiving relay 835 and the first counting chain relay 915 over the circuits previously described. The receiving relay 835 operates and once more conditions the equipment for receipt of a series of impulses from the dispatch office and reopens a point in the local metering circuit at contacts 836. Counting chain relay 915 operates and at its contacts 918 prepares an operating circuit for the first sequence relay 910, which is presently shunted by the completed operating circuit for the counting chain relay 915.

As the control station impulse sending relay 665 effects the first release of the line relays 680 and 1000 for this code, line relay 680 is effective at its contacts 681 to open the shunt circuit for the first sequence relay 210 to thereby effect the operation of relay 210 in series with the first counting chain relay 215. Similarly, at the substation the release of the line relay 1000 is effective to open the contacts 1001 and remove the shunt for the sequence relay 910 to effect the operation of relay 915.

With the second energization of the line relays 680 and 1000, control station line relay 680 is effective at its contacts 681 to complete an operating circuit for the second counting chain relay 220. Counting chain relay 220 operates and at its contacts 223 prepares a series operating circuit for the second sequence relay 205 which is presently held inoperative by reason of the shunt imposed thereupon by the initial operating circuit for the counting chain relay 220.

Inasmuch as the point to be selected is the second point of the second group, only two impulses need to be transmitted and the equipment now prepares to terminate the impulse transmission by operating the point stop relay 640. Counting chain relay 220 at its contacts 222 completes an operating circuit for the point stop relay 640, the circuit therefore extending from battery over the winding of relay 640, contacts 642, C34, contacts 344, contacts 325, C48, contacts 432, C91, contacts 701, contacts 712, C7, contacts 222, contacts 226, contacts 231, 236, 241, 246, 251, 256, 261, C354, contacts 302, contacts 372 and contacts 331 to ground. Point stop relay 640 operates and at its contacts 641 completes an obvious self-holding circuit to ground, and at its contacts 664 opens the energizing circuit for the sending control relay 360.

At the substation the second energization of line relay 1000 effects the closure of contacts 1001 and the completion of an operating circuit to the second counting chain relay 920, which operates and prepares a series circuit for its associated sequence relay 905, which is maintained inoperative by the shunt imposed thereupon by the completed operating circuit of the counting chain relay 920.

As the line relays 680 and 1000 release for the second time, line relay 680 is effective at its contacts 681 to interrupt the shunt circuit for the second sequence relay 205 to effect the operation thereof. Relay 205 operates and at its contacts 206 interrupts the holding circuit for the first counting chain relay 215 and the first sequence relay 210 to effect the restoration thereof. Line relay 680 at its contacts 683 also interrupts the second energizing circuit for the sending control relay 360 and in that the point stop relay 640 has interrupted the first energizing circuit therefore, the relay is restored. Relay 360 at its contacts 361 interrupts the operating circuits for the sending drive relays 350 and 340 which responsively release. Drive relay 350 at its contacts 352 recompletes a point in the local metering path and at its contacts 351 interrupts the holding circuit for the second counting chain relay 220 and the second sequence relay 205 to effect the restoration thereof. As the line relay 1000 is restoring for the second time in the series, the shunt circuit for the second sequence relay 905 is interrupted to effect operation of the sequence relay 905 over a circuit extending from battery over the winding of the second counting chain relay 920, contacts 922, sequence relay 905, contacts 904, C1304, contacts 809, contacts 814, C1357, contacts 1055, contacts 1074, contacts 1063 to ground. Sequence relay 905 operates and at its contacts 909 interrupts the holding circuit for the first counting chain relay 915 and the first sequence relay 910 which are responsively restored.

The registration of the point selection code received is now made at the substation equipment. Inasmuch as the impulse transmission from the control office has been terminated, line relay 1000 will be restored for a period of time which is sufficient to effect restoration of the slow-to-release receiving relay 835.

Relay 835 at its contacts 836 recompletes a point in the local metering path and at its contacts 837 and 839' completes operating circuits to the point selection relays 1110 and 1120, the circuits therefore extending from battery over the windings of the respective relays 1110 and 1120, C1346, contacts 1046, contacts 1072, 1061, C1364, contacts 857, contacts 839', contacts 833, C1355, contacts 1035, C1360, contacts 837 to ground.

The point selection relays 1110 and 1120 operate and point selection relay 1110 at its contacts 1116 completes a holding circuit for the relay pair which extends from battery over the respective windings of the relays 1110 and 1120, contacts 1116, C1345, contacts 1044, C1353 and contacts 874 to ground. Point selection relay 1110 at its contacts 1112 completes an operating circuit for the point selection relay 1215, which is associated with the second point of the second group, the circuit therefor extending from battery over the winding of relay 1215, C1337, contacts 1172, contacts 1112, C1328, contacts 923, 929', 934, 939, 944, 949, 954, 959, 964, C1311, contacts 852 and 827 to ground. The operating ground which is extended to point selection relay 1215 by the point selection relay 1110 is also extended to metering relay 1292 over an obvious path.

G. *Point check transmission.*—In that the point selection code is now registered, it is necessary to transmit an informative digit to the control station which identifies the point selection digit received and to also condition the equipment for telemetering of the desired information as soon as the point check is made by the control station. Accordingly, point selection relay 1215 operates and at its contacts 1218 extends the local metering circuit to the transmitter 1293 for selected point 12. Relay 1215 at its contacts 1218' extends its operating ground to point code relay 1050, the operating circuit therefor extending from battery over the winding of the point code relay 1050, C1342, contacts 1218' to the operating ground provided by the group selection relay 1170 and point selection relay 1110. Point code relay 1050 operates and at its contacts 1054 completes a holding circuit for itself, the point selection relay 1215 and metering relay 1292, which holding circuit extends over contacts 1054, 1074 and 1063 to ground. Point code relay 1050 at its contacts 1055 also interrupts the holding circuit for the second counting chain relay 920 and the second sequence relay 905 to effect the restoration thereof.

Sequence relay 905 restores and at its contacts 906 interrupts the holding circuit for the receiving control relay 830 to effect the restoration thereof. Relay 830 restores and at its contacts 832 effects the restoration of associated receiving control relay 825.

The equipment at the sub-station now prepares to transmit the point check code to the control office to indicate to the operator thereat the particular substation point which has been chosen as a result of the code transmission. As the receiving control relay 825 restores, it is effective at its contacts to complete an operating circuit for the sending control relay 820, the circuit therefor extending from battery over the winding of sending control relay 820, contacts 826, C1358, contacts 1051, contacts 1041, contacts 1023 to ground. The sending control relay 820 operates and at its contacts 821 completes operating circuits for the sending drive relays 810 and 815, and at its contacts 822 extends its operating ground over C1365, contacts 1004, contacts 846, C1368 to the sending relay 1010 to once more initiate operation of the impulse pumping arrangement. Relay 810 operates and at its contacts 811 opens a point in the local metering circuit. Impulse sending relay 1010 operates and at its contacts 1013 and 1015 completes the operating circuits for the line relays 680 and 1000.

Substation line relay 1000 operates and at its contacts 1001 completes the operating circuit to the first relay 915 of the counting chain and at its contacts 1004 interrupts the operating circuit for the sending relay 1010 to effect the restoration thereof. The counting chain relay 915 operates and at its contacts 918 prepares a series circuit for its associated sequence relay 910 which is held inoperative pending removal of the shunt circuit effected by the initial operating circuit for the counting chain relay 915.

At the control station the line relay 680 operates and at its contacts 681 completes operating circuits for the receiving relay 384 and the first counting chain relay 215. The receiving control relay 384 operates and conditions the control station equipment for receipt of the point check code which is being transmitted by the substation. Relay 384 at its contacts 387 also completes an operating circuit for check-back relay 310 which extends from battery through resistor 310' over the check-back relay 310, contacts 387, 324, C24, contacts 614 to ground. The check-back relay operates and locks itself over contacts 313, contacts 324, C24 and contacts 614 to ground. Counting chain relay 215 operates and prepares a series circuit for its associated sequence relay 210.

As the substation continues its impulse transmission, line relays 680 and 1000 release, and line relay 1000 at its contacts 1001 interrupts the energizing circuit for the first counting chain relay 915 to remove the shunt from the sequence relay 910 to permit the operation thereof. At the control office the release of the line relay 680 effects the opening of the initial energizing circuit for the first counting chain relay 215 to remove the shunt from the sequence relay 210 and to thereby permit the operation thereof. Sequence relay 210, in operating, is effective at its contacts 214 to complete an energizing circuit for the receiving control relay 380. Receiving control relay 380 operates and at its contacts 381 closes an operating circuit for an auxiliary relay 370, and at its contacts 382 establishes a holding circuit over the contacts of the operated one of the sequence relays. Relay 370 operates and opens a point in the local metering path.

As the pumping operation continues, line relays 1000 and 680 are operated a second time, and line relay 1000 at its contacts 1001 completes an operating circuit for the second counting chain relay 920. Counting chain relay 920 operates and at its contacts 922 prepares a series circuit with its associated sequence relay 905 which is presently held inoperative by reason of the shunt temporarily imposed thereon.

In that the check-back signal in this example comprises only two impulses, it is now necessary to operate the point check relay 1040 to initiate termination of the impulses. Counting chain relay 920 at its contacts 923 therefor completes an operating circuit for the point check relay 1040, which extends from battery over the winding of the point check relay 1040, contacts 1053, C1356, contacts 881, contacts 828, contacts 852, C1311, contacts 964, 959, 954, 949, 944, 939, 934, 929', 923, C1328, contacts 1112, contacts 1172, contacts 1218', C1342, contacts 1055, contacts 1074, 1063 to ground.

It is noted that operation of the point check relay is determined by the value of the received and registered point selection digit. Thus, if the received digit had been four, the point check relay would not be operated until four impulses had been transmitted for the check code.

Point check relay 1040 operates and at its contacts 1044 interrupts the holding circuit for the point selection control relays 1110 and 1120. The point selection control relays are responsively restored. The point check relay 1040 at its contacts 1041 also interrupts the first of the energizing circuits for the sending control relay 820, which is held operated, however, over a second energizing circuit extending over the contacts of the line relay 1000.

At the control office with the second operation of the line relay 680, contacts 681 are closed to complete an operating circuit for the second counting chain relay 220. Counting chain relay 220 operates and at its contacts 223 prepares an operating circuit for its associated sequence relay 205, which is temporarily held inoperative by the shunt imposed thereon by the completed operating circuit for the counting chain relay 220.

As line relay 1000 releases for the second time, contacts 1001 are opened to interrupt the shunt of the second sequence relay 905. Sequence relay 905 operates, and at its contacts 909 interrupts the operating circuit for the first counting chain relay 915 and the first sequence relay 910 to effect the restoration thereof. Line relay 1000, at its contacts 1003, is also effective to interrupt the second energizing circuit for the sending control relay 820 to effect the restoration thereof, it being apparent that with restoration of the sending control relay 820 the transmission of the point check code is terminated. That is, the sending control relay 820, in restoring, is effective at its contacts 821 to interrupt the energizing circuit for the sending drive relays 810 and 815, respectively, to effect the restoration thereof, and at its contacts 822 to also interrupt the energizing circuit for the pumping arrangement. Sending drive relay 815, in releasing, is effective at its contacts 816 to interrupt the holding circuit for the counting chain relay 920 and the sequence relay 905 to effect the restoration thereof. Relay 810, being of the slow-to-release type, holds contacts 814 open long enough to permit relays 920 and 905 to release and at its contacts 811 recompletes the locally controlled portion of the metering path to point twelve, and connects the telemeter transmitter output for point twelve to the line circuit. Metering is effected at the control office with the restoration of sending control relay 370 and operation of point selection relay 190 at approximately the same time.

Specifically, at the control office, as the line relay 680 is released for the second time in the point check impulse series, the shunt is removed from the second sequence relay 205 which thereupon operates in series with its associated counting chain relay 220. Relay 205 in operating is effective at its contacts 206 to interrupt the holding circuit for the first sequence relay 210 and the first counting chain relay 215 to effect the restoration thereof.

It is assumed at this point that the check-back signal agrees with the point selection signal transmitted, and as the line relay 680 now remains in the restored position for a prolonged period as a result of the termination of the impulses by the substation, sufficient time elapses to permit the restoration of the slow-to-release receiving relay 384 and to initiate the registration of the point check code received for comparison purposes. Receiving relay 384 restores and at its contacts 386 effects the operation of point selection control relays 530 and 540, the circuit therefor extending from battery over the windings of the point selection control relays 530 and 540, C53, contacts 625, contacts 612, contacts 645, C27, contacts 304, contacts 383 and contacts 386 to ground. Point selection control relays 530 and 540 operate and relay 530 at its contacts 535 completes a circuit for shunting check-back relay 310, the shunt circuit extending from battery over the resistance 310, C50, contacts 535, C46, contacts 345, contacts 325, C48, contacts 432, C91, contacts 701, contacts 712, C7, contacts 222, 226, 231, 236, 241, 246, 251, 256, 261, C364, contacts 302 and contacts 371 to ground. The check-back relay 310 responsively releases.

It is apparent from the description of the equipment heretofore that, in the event that a check-back signal other than "two" is received, the equipment is reset to normal. Specifically, a counting chain relay other than relay 220 will be operated and, as a result, the shunting circuit for check-back relay 310, which extends over the point start relay 710, will be interrupted by open contacts 222. The check-back relay will accordingly remain energized, and as the receiving control relay 370 is eventually released, the reset relay 600 will be operated to reset the equipment at both stations. The energizing circuit will, therefore, extend from battery over the winding of the reset relay 600, contacts 604, C29', contacts 312, 374, 314, C26, contacts 635, 616, 629', C51, contacts 519 to ground. It is seen, therefore, that in the event of improper impulse transmission, the equipment is automatically reset.

Continuing with the description of the circuit operation in the event that the transmitted point selection signal and the check-back signal agree, as point selection control relay 530 operates it is effective at its contacts 532 to complete an operating circuit for point selection relay 190, the operating circuit therefor extending from battery over the winding of relay 190, C92, contacts 435, C66, contacts 532, C7, contacts 222, 226, 231, 236, 241, 246, 251, 256, 261, C364, contacts 302, contacts 371 to ground. Point selection relay 190 operates and at its contacts 193 extends its operating ground to the point code relay 630 and at its contacts 191 completes an operating circuit for the white selection lamp 116 to indicate to the attendant that point 12 at the substation has been selected. The circuit for the lamp extends from negative battery over one side of the lamp switch 490, C99, the filament of the lamp 116, contacts 191 to C82 and the other side of the lamp switch 490 to positive battery. Point code relay 630 operates over a circuit extending over contacts 193, conductor 52 and the winding of the point code relay 630 to battery and at its contacts 631 locks itself and point selection relay 190 over the contacts 643 of the point stop relay. Point code relay 630 at its contacts 632 effects the release of the second counting chain relay 220 and its associated sequence relay 205. Counting chain relay 220 and sequence relay 205 restore and sequence relay 205 at its contacts 209 interrupts the holding circuit for the receiver control relay 380 to effect the restoration thereof. Relay 380 restores and at its contacts 381 opens the operating circuit for its associated control relay 370, and at its contacts 383 interrupts the operating circuit for the point selection relays 530 and 540, respectively. Control relay 370 restores and at its contacts 373 completes a point in the local metering circuit.

With the operation of the point selection relay 190 and the release of control relay 370, the telemetering circuit is automatically completed to extend the desired information to the control station attendant, the circuit therefor extending from the positive lead of telemetering transmitter 1293 via resistor 1018, over contacts 1011, line relay 1000, contacts 1014, C85, line relay 680, C42, meter 119, contacts 195, C47, contacts 373, 352, 325a, C30, resistor 659, contacts 669, C36, contacts 1012, C1361, contacts 838, 872, 836, 811, C1352, C1343, contacts 1218 to the negative lead of the telemetering transmitter equipment 1293.

The attendant, in receiving the telemetered information in addition to the visual signal is informed of the point selection and the load conditions thereat. The attendant now effects operation of the equipment in accordance with the nature of the information received.

In the event that the load characteristics are considered normal, the attendant will operate the reset key 404 to operate reset relay 600 and to effect reset of the equipment in a manner more fully described hereinafter.

*Close control*

Assuming however that the telemetered information indicates that the circuit breaker at point 12 should be closed, such operation is effected by closure of the common close key 408 at the control station by the attendant. With closure of the key, an operating circuit is completed for the operation code control relay 510, the circuit therefor extending from battery over the winding of relay 510, C63, contacts 408', C45, contacts 516, 523, C58, contacts 673, 631, and 643 to ground. Code control relay 510 operates and at its contacts 511 extends this operating ground over conductor 44 to the second operation code control relay 620.

As explained by the legend, the operation code control relays 510, 620 and 610 are arranged to send the trip code—3 impulses—or the close code—5 impulses—in accordance with their manner of operation. Relays 510 and 620, when operated in combination as effected by operation of the close key, effect the transmission of the close code of five impulses to the substation. Specifically, control relay 620 operates and at its contacts 621 locks the code control relay 510 and itself to ground independent of the close key 408, the locking circuit extending from battery over the winding of relay 620, contacts 621, conductor 45, contacts 516, 523, C58, contacts 673, 631 and 643 to ground. The locking circuit for relay 510 extend from battery over the winding of 510, contacts 511, 621, C45, contacts 516, 523, C58, contacts 673, 631 and 643 to ground.

Operation code control relay 620 at its contacts 623 completes an operating circuit for the sending control relay 360, which circuit extends from battery over the winding of sending control relay 360, contacts 311, 374, C33, contacts 623, contacts 635, contacts 616, contacts 629', C51, contacts 519 to ground. Sending control relay 360 is now operated to condition the set for automatic transmission of a series of five impulses (the close code) to indicate to the substation that the closing of the equipment at the selected point is desired. Sending control relay 360 at its contacts 363 extends its operating ground over C35, contacts 684, contacts 604 to the impulse sending relay 665 to again initiate operating of the impulse pumping arrangement. Sending control relay 360 at its contacts 361 also completes operating circuits for sending drive relays 350 and 340. Drive relay 350 operates and at its contacts 352 interrupts the circuit for the metering equipment 119.

As the impulse sending relay 665 is operated, it is effective at its contacts 667 and 668 to effect closure of the operating circuits for the line relays 680 and 1000 and to then initiate sending of the close control code.

Relay 680 at the control office operates and at its contacts 681 effects the completion of the operating circuit for the first counting chain relay 215, and at its contacts 684 interrupts the operating circuit for the impulse sending relay 665 to effect the restoration thereof. Counting chain relay 215 operates and at its contacts 217 prepares an operating circuit for its associated sequence relay 210, which is held inoperative pending removal of the shunt created by the completed operating circuit for the counting chain relay 215.

The first energization of the line relay 1000 at the substation responsive to initiation of the close control code transmitted effects the closure of contacts 1001 and the completion of a circuit to the receiving relay 835, which condition the equipment at the substation for the receipt of the close control code and disconnects the telemetering transmitter from the line circuit.

It is noted that the telemetering equipment is connected to the line circuit during the transmission of the first impulse by the control station at this time, but since the metering path is arranged to conduct in the same direction as the signalling path, a preenergizing of the line relay 1000 is effected. The metering and signal currents being in additive relation, a more positive operation of the line relay is effected.

Line relay 1000 at its contacts 1001 also completes an operating circuit to the first counting chain relay 915, which operates and at its contacts 918 prepares an operating circuit for its associated sequence relay 910. Sequence relay 910 remains inoperative at the time pending removal of the shunt created by the initial operating circuit for counting chain relay 915.

As the impulse transmission continues, line relays 680 and 1000, respectively, are released and line relay 680 at its contacts 681 interrupts the shunt circuit for the first sequence relay 210 to effect the operation thereof.

The release of the line relay 1000 at the substation effects removal of the shunt for the first sequence relay 910 to effect the operation thereof. Sequence relay 910 operates and at its contacts 911 completes an operating circuit for the receiving control relay 830. Receiving control relay 830 operates and at its contacts 832 effects an obvious operating circuit for associated receiving relay 825, the relays 825 and 830 in combination further preparing the equipment at the substation, as before, for the receipt of the incoming code.

As the line relays 680 and 1000 are energized for the second time in the code transmission, line relay 680 at its contacts 681 completes an operating circuit for the second counting chain relay 220 which operates, and at its contacts 223 prepares a series operating circuit for its associated sequence relay 205. Sequence relay 205, however, remains inoperative awaiting removal of the shunt imposed thereon by the completed operating circuit for the counting chain relay 220. At the substation, the second operation of the line relay 1000 effects the closure of its contacts 1001 to complete an operating circuit for the second counting chain relay 920, which operates and at its contacts 922 prepares an operating circuit for its associated sequence relay 905. Sequence relay 905 is held inoperative by the completed operating circuit for the counting chain relay 920.

Line relays 680 and 1000 are deenergized for the second time in the code impulse transmission and line relay 680 at its contacts 681 removes the shunt for the second sequence relay 205 to effect the operation thereof in series with the counting chain relay 220. The sequence relay 205 operates and at its contacts 206 interrupts the holding circuit for the sequence relay 210 and the first counting chain relay 215 to effect the restoration thereof. At the substation, the second release of the line relay 1000 effects the opening of its contacts 1001 to remove the shunt from the second sequence relay 905 to effect the operation thereof. The sequence relay 905 operates over a circuit extending from battery over the winding of the counting chain relay 920, contacts 922, the winding of sequence relay 905, contacts 904, C1304, contacts 809, contacts 814, C1357, contacts 1031, contacts 1042, contacts 1023 to ground. Sequence relay 905 operates and at its contacts 909 interrupts the holding circuit for the first sequence relay 910 and the first counting chain relay 915 to effect the restoration thereof.

As the pumping operation continues, line relays 680 and 1000 operate for the third time and line relay 680 at its contacts 681 effects the closure of an operating circuit to the third sequence relay 225 which operates and at its contacts 228 prepares an operating circuit to its associated sequence relay 200, which is held inoperative at the present time by the shunt circuit imposed thereupon by the completed operating circuit for the counting chain relay 225. At the substation, the operation of the line relay 1000 for the third time effects closure of contacts 1001 and the operation of the third counting chain relay 925. Counting chain relay 925 operates and at its contacts 928 prepares an operating circuit for its associated sequence relay 900 which is maintained inoperative by the shunt circuit imposed thereupon by the completed operating circuit to the counting chain relay 925.

The third release of the line relay 680 effects removal of the shunt for the third sequence relay 200 which operates and at its contacts 202 interrupts the holding circuit for the second sequence relay 205 and the second counting chain relay 220 to effect the restoration thereof. Similarly, at the substation the restoration of line relay 1000 effects the opening of its contacts 1001 and removal of the shunt from the third sequence relay 900 to effect the operation thereof. Sequence relay 900 in operating is effective at its contacts 904 to interrupt the operating circuit for the second sequence relay 905 and the second counting chain relay 920 to effect the release thereof.

The pumping action of the control station continues to effect the fourth energization of the line relays 680 and 1000. Line relay 680 at its contacts 681 completes an operating circuit for the fourth counting chain relay 230, the circuit therefor extending from battery over the winding of the relay 230, contacts 305, C359, contacts 229, contacts 203, C368', contacts 338, C38, contacts 282, C39, contacts 291, C40, contacts 681 to ground. The fourth counting chain relay 230 operates and at its contacts 233 prepares an operating circuit for its associated sequence relay 210, which is held inoperative at the present time by reason of the shunt imposed thereon by the completed operating circuit for the counting chain relay 230. Similarly, at the substation the energization of the line relay 1000 effects closure of contacts 1001 and the operation of the fourth counting chain relay 930, the circuit extending from battery over the wind of the fourth counting chain relay 930, C1313, contacts 859, C1312, contacts 927, 903, C1303, contacts 808, contacts 843, C1366, contacts 1001 to ground. The fourth counting chain relay 930 operates and at its contacts 932 prepares a series operating circuit for its associated sequence relay 910 which is presently maintained inoperative by reason of the shunt imposed thereon by the completed energizing circuit for the counting chain relay 930. It is apparent that the counting chains do not absorb the first three impulses, as in the initial operation, by reason of the operated condition of the protective relays 855 and 303.

The impulse transmission continues and line relays 680 and 1000 deenergize. Line relay 680 at its contacts 681 removes the shunt from the sequence relay 210 to effect the operation thereof. Sequence relay 210 is operated over a circuit extending from battery over the fourth counting chain relay 230, contacts 233, winding of the sequence relay 210, contacts 206, C369, contacts 351 to ground. Sequence relay 210 at its contacts 211 interrupts the holding circuit for sequence relay 200 and the third counting chain relay 225 to effect the restoration thereof. The line relay 1000 at the substation in releasing for the fourth time effects the removal of the shunt for the sequence relay 910 to effect the operation thereof, the series operating circuit therefor extending from battery over the winding of the fourth counting chain relay 930, contacts 932, winding of the sequence relay 910, contacts 909, C1304, contacts 809, 814, C1357, contacts 1031, 1042, 1023 to ground. Sequence relay 910 operates and at its contacts 914 interrupts the holding circuit for the sequence relay 900 and the third counting chain relay 925 to effect the restoration thereof.

The impulse sending arrangement now effects the fifth energization of the line relays 680 and 1000 and line relay 680 at its contacts 681 completes an operating circuit for the fifth counting chain relay 235. Counting chain relay 235 operates and at its contacts 238 prepares an operating circuit for its associated sequence relay 205 which is maintained inoperative at the present time by reason of the shunt imposed by the completed operating circuit for the counting chain relay 235.

In that the close control code comprises five impulses, the termination of the operation of the automatic transmitting arrangement is now required, and counting chain relay 235 at its contacts 237 therefor completes an operating circuit for the operation code control relay 610, which extends from battery over the winding of the control relay 610, contacts 622, C28, contacts 353, C21, contacts 503, contacts 512, C10, contacts 237, 241, 246, 251, 256, 261, C364, contacts 302, contacts 372, contacts 331 to ground. Code control relay 610 operates and at its contacts 616 opens a point in one of the energizing circuits for the sending control relay 360 to prepare the restoration thereof with the next release of the line relay 680, the sending control relay now being maintained operative over an energizing circuit controlled thereby.

The fifth operation of the line relay 1000 at the substation is effective to close contacts 1001 and thereby complete an operating circuit for the fifth counting chain relay 935, the operating circuit extending from battery over the winding of chain relay 935, contacts 931, contacts 913, 907, 902, C1303, contacts 808, contacts 843, C1366 and contacts 1001 to ground. The counting chain relay 935 operates and at its contacts 937 prepares a series operating circuit for its associated sequence relay 905, which is presently maintained inoperative by reason of the shunt imposed thereon by the initial energizing circuit for the counting chain relay 935.

As the line relays 680 and 1000 restore for the fifth time, line relay 680 at its contacts 681 is effective to interrupt the shunt circuit for the sequence relay 205 which operates and at its contacts 206 interrupts the holding circuit for the first sequence relay 210 and the fourth counting chain relay 230 to effect the restoration thereof. Line relay 680 at its contacts 683 also interrupts the second energizing circuit for the sending control relay 360 to effect the restoration thereof.

Sending relay 360 releases and at its contacts 361 interrupts the operating circuits for the sending drive relays 340 and 350 to thereby terminate the transmission of the close controlling code.

It is to be noted that the sending control relay 340 is slow-to-release to insure that the counting chain locking circuit is maintained open for a sufficient interval to permit the release thereof, the interruption of the counting chain locking circuit being accomplished by the release of the sending driver relay 350 and the opening of its associated contacts 351. The counting chain relay 235 in restoring with interruption of its holding circuit, opens a further point in the holding circuit at its contacts 238, so that upon restoration of the slow-to-release sending drive relay 340, the counting chain relay will not be operated.

With the fifth restoration of the line relay 1000 at the substation, contacts 1001 are opened and the shunt circuit for the sequence relay 905 is removed to effect the operation thereof. Sequence relay 905 operates and at its contacts 909 interrupts the holding circuit for the first sequence relay 910 and the fourth counting chain relay 930 to effect the restoration thereof. As a result of the termination of the transmittal of the control closing code by the control office, the line relay 1000 will be maintained inoperative for a prolonged period and the contacts 1001 will be in the open position. After a brief interval of time the receiving relay 835 for the substation will responsively release, whereby the substation equipment is transferred from the receiving condition and prepared to effect switch closure. At contacts 836, relay 835 recloses the metering circuit.

Such operation is accomplished with the release of the receiving relay 835 which at its contacts 839' is effective to complete an operating circuit for the operation control relay 885, the circuit extending from battery over the winding of relay 885, C1354, contacts 1045, contacts 1072, contacts 1061, C1364, contacts 857, contacts 839', contacts 833, C1355, contacts 1035, C1360 and contacts 837 to ground. The operation control relay 855 operates and at its contacts 886 completes an operating circuit for the close relay 1290, the circuit for which extends from battery over the winding of close relay 1290, contacts 1217, C1340, contacts 1103, C1371, contacts 936', contacts 886 to ground. The operated close relay 1290 thereupon effects the closure of the circuit breaker associated with point 12. Thus, the desired automatic selection and operation is effected in a safe, reliable manner. It is important that the attendant be informed of this closure and the breaker is accordingly equipped with a set of auxiliary switch contacts, such as 1291, which close with operation of the breaker.

As the breaker auxiliary switch contacts 1291 are closed, therefore, the substation is conditioned to transmit a close indication code.

*Close indication code*

Specifically, as the breaker auxiliary switch contacts 1291 are operated, the point indicating relay 1235 is operated over a circuit extending from battery, the winding of relay 1235, contacts 1272, 1291 to ground. Simultaneously, with the operation of the control relay 1235, the closure of breaker auxiliary switch contacts 1291 effects the completion of an operating circuit for the indication control relay 970, the circuit extending from battery over the winding of the relay 970, C1335, contacts 1219, 1272, 1291 to ground. Indication control relay 970 is operative to determine the number of impulses to be transmitted in the indication code, it being operative to effect transmission of three impulses in its restored condition and five impulses in its operated condition. Point indication relay 1235 operates and at its contacts 1238 and 1239' opens the operating circuit for automatic point start relay 1270 to effect the release thereof. A holding circuit for the point indication relay 1235 and the indication control relay 970 is completed upon release of the automatic point start relay 1270, which circuit extends from battery over the windings of the relays, contacts 1271, 1236 to ground.

Indication control relay 970 operates and at its contacts 974 completes an operating circuit for the time delay control relay 1095, the circuit extending from battery over the winding of time delay relay 1095, contacts 1099, C1351, contacts 887, C1351', contacts 937', contacts 974 to ground.

A time delay relay arrangement comprising relays 1095 and 1098 has been introduced into the substation equipment to provide ample time for the breaker to close before releasing the close relay 1290.

Time delay relay 1095 operates and at its contacts 1096 completes an operating circuit for its associated time delay relay 1098. Associated time delay relay 1098 operates and at its contacts 1099 opens the operating circuit for the time delay relay 1095 and at its contacts 1099' connects its winding to the operating ground of the time delay relay 1095.

After a brief time interval has elapsed, time delay relay 1095, of the extra-slow-to release type will release and at its contacts 1097 extend its initial operating ground and the operating ground for time delay relay 1098 to the supervisory code relay 1030. The supervisory code relay 1030 operates and at its contacts 1034 completes a self-holding circuit which extends from battery over the relay 1030, its contacts 1034, C1360, contacts 837 to ground. The holding circuit for the supervisory code relay 1030 is likewise effective for the time delay relay 1098 in an obvious manner.

Supervisory code relay 1030 at its contacts 1035 interrupts the holding circuit for the close control relay 885 and effects the restoration thereof. Supervisory code relay 1030 at its contacts 1031 also interrupts the holding circuit for the second sequence relay 905 and the fifth counting chain relay 935 to effect the release thereof. Sequence relay 905 in releasing effects the opening of its contacts 906 to interrupt the holding circuit for the receiver control relay 830, which releases and at its contacts 832 opens the holding circuit for its associated receiver control relay 825.

The substation equipment is now in condition for effecting transmittal of a close indication code to indicate to the attendant at the dispatch office that the desired circuit closing operation has been effected at the substation.

This transmittal of information is initiated with the restoration of the receiving control relay 825, which is effective at its contacts 826 to complete an operating circuit for the sending control relay 820; the circuit extending from battery over the winding of relay 820, contacts 826, C1358, contacts 1051, contacts 1032, contacts 1042, contacts 1023 to ground. The sending control relay 820 operates in a manner heretofore described to control operation of the sending drive relays 810 and 815 and the completion of the energizing circuit for the sending relay 1010 and the impulse pumping arrangement. Relay 810 at its contacts 811 interrupts the metering circuit at a further point. The impulse sending relay 1010 operates and at its contacts 1013 and 1015 completes the operating circuits for the line relays 680 and 1000 at the respective stations.

The pumping operation at the substation effects the alternate energization and deenergization of the line relays 680 and 1000 and the sequential operation of the counting chain relays 915 to 935 with their associated sequence relays 900 to 910, inclusive, in the manner heretofore described. That is, with each energization of the line relay, a counting chain relay is operated, and with each release of the line relay 1000 its associated sequence relay is energized. As the fifth counting chain relay 935 is operated with the fifth energization of the line relay 1000, an associated sequence relay 905 is prepared, the sequence relay 905 remaining inoperative pending the removal of the shunt imposed by the completed operating circuit of counting chain relay 935. Counting chain relay 935 operates and at its contacts 938 completes an operating circuit for the supervisory code relay 1020, the operating circuit extending from battery over the winding of relay 1020, contacts 1033, contacts 1021, C1362, contacts 817, C1315, contacts 972, C1326, contacts 938, 944, 949, 954, 959, 964, C1311, contacts 852, contacts 828, 881, C1356, contacts 1053, 1043, C1353, contacts 874 to ground.

Supervisory code relay 1020 operates and at its contacts 1022 completes a holding circuit which extends from battery over the winding of relay 1020, contacts 1033 and contacts 1022 to ground. Relay 1020 at its contacts 1025 extends its operating ground over resistor 1026, C1341, contacts 1219' and contacts 1239, the winding of automatic point start relay 1270, contacts 1237, to battery. Automatic point start relay 1270 operates and at its contacts 1272 locks the point indicating relay 1235 over the auxiliary switch contacts 1291 to ground, and at its contacts 1275' completes a self-holding circuit which extends from battery over contacts 1237, the winding of relay 1270, contacts 1239, resistor 1247, contacts 1275', C1292 and contacts 1107 to ground. Supervision code relay 1020 at its contacts 1023 opens a point in one of the energizing circuits for the sending control relay 820 and the termination of the automatic transmission of the impulses is thereby initiated.

As the line relay 1000 restores for the fifth time, the second energizing circuit for the sending control relay 820 is opened by the contacts 1001, whereupon sending control relay 820 restores and at its contacts 822 interrupts the operating circuit for the impulse sending relay to terminate the further transmission of the impulses. Relay 820 at its contacts 821 also effects the restoration of sending drive relays 810 and 815. Sending drive relay 815 in its restoration, at its contacts 816, effects the interruption of the holding circuit for the operated counting chain relay 935 and the operated sequence 905 to effect the restoration thereof. Relay 812 restores slowly and at its contacts 814 holds the operating circuit open long enough for 935 and 905 to release.

Referring now to the control office and the operation of the equipment thereat responsive to receipt of the close indication code and the consequent five operations of the line relay 680, the first energization of the line relay 680 effects the conditioning of the control office equipment to receive a set of coded impulses from the substation by operating the receiving relay 384 and the first counting chain relay 215. With the first deenergization of the line relay 680, the opening of the contacts 681 effects the operation of the sequence relay 210, relay 210 operating over a series circuit extending from battery over the winding of the first counting chain relay 215, contacts 217, the winding of the sequence relay 210, contacts 206, C369, contacts 343, C36, contacts 615, contacts 629, C51, contacts 519 to ground. Each of the sequence relays are operated by the ground presently connected to C36 upon removal of its shunt circuit imposed by the operating circuit of its associated counting chain relay. The sequence relay 210 in operating also effects the operation of the receiving control relay 380, which in turn operates 370.

The subsequent energization and deenergizations of the line relay 680 effect the sequential operation of counting chain relay 220 and its associated sequence relay 205, counting chain relay 225 and its associated sequence relay 200, counting chain relay 230 and its associated sequence relay 210, counting chain relay 235 and its associated sequence relay 205.

Following receipt of the five impulses, the line relay 680 remains in the restored condition. Accordingly, after a brief period of time has elapsed, the receiving relay 384 restores.

Receiving relay 384 restores and at its contacts 386 completes an operating circuit for the supervisory control relay 280, the circuit therefor extending from battery over the winding of the supervisory control relay 280, C43, contacts 611, contacts 645, C27, contacts 304', contacts 383, contacts 386 to ground.

The supervisory control relay 280 operates and at its contacts 281 completes an operating circuit for the auxiliary supervisory control relay 270, the circuit therefor extending from battery over the winding of the relay 270, contacts 223', C73, contacts 184', 196, C80, contacts 281 to ground.

The auxiliary supervisory relay 270 operates and at its contacts 272 completes an obvious self-holding circuit in combination with the contacts 281 to ground. The auxiliary supervisory control relay at its contacts 275 completes an operating circuit for the point indication relay 180, the circuit therefor extending from ground over the winding of the relay 180, contacts 194, C98, contacts 235' and 275 through resistor 278 to battery.

The point indication relay 180 operates and at its contacts 184 completes an operating circuit for the indication agreement relay 515, the circuit therefor extending from battery over the winding of the relay 515, C77, contacts 236', C83, contacts 184, contacts 196, C80, contacts 281 to ground.

Point indication relay 180 at its contacts 183 interrupts the lighting circuit for the green lamp 118 at the control board, which was indicative of the open condition of the circuit breaker on the twelfth point at the substation, and at its contacts 182 completes a lighting circuit for the red lamp 117 at the control board to indicate the closed condition of that circuit breaker at the present time. The lighting circuit for the red lamp extends from negative battery over one side of the energizing switch 490, C99, the filament of the lamp 117, contacts 182, contacts 173, C82, the other side of switch 490 to positive battery.

The indication agreement relay 515 is arranged to initiate reset of the equipment after the code indication has been received and the point indication relay has functioned, and at its contacts 518 now completes an operating circuit for the reset control relay 600, which circuit extends from battery over the winding of the relay 600, contacts 608, C29, contacts 524, contacts 518 to ground. Reset relay 600 operates and at its contacts 602 completes an obvious self-holding circuit which extends from battery over the winding of reset relay 600, contacts 608, contacts 602 to ground. Indication agreement relay 515 at its contacts 516 interrupts the locking circuit for the operation code control relays 510 and 620 which responsively release. Indication agreement relay 515, at its contacts 519, interrupts the holding circuit for the counting chain relay 235 and the associated sequence relay 205 to also effect the restoration thereof, which, in turn, effects release of relays 380 and 370. Operation code control relay 620 in its release is effective to open contacts 622 to interrupt the energizing circuit for the associated operation code control relay 610 which also restores. The operation code control relay 610 at its contacts 611 interrupts the holding circuit for the supervisory control relay 280 to effect the restoration thereof and supervisory control relay 280, in restoring, opens its contacts 281 to effect the release of the auxiliary supervisory relay 270.

The registration of the close indication pulses from the substation is thus completed to inform the attendant, by operation of the lamp 117 associated with the selected circuit breaker, that the operation of the selected circuit breaker has been effected. The equipment at the control office and substation is now automatically reset to its normal condition to prepare the equipment for subsequent control or supervisory operations.

*Reset of equipment*

Reset relay 600 initiates the reset of the equipment at the dispatch office by effecting the closure of its contacts 603 to operate the impulse sending relay 665 over an obvious circuit and effect the transmission of a reset signal consisting of a single long pulse. The impulse sending relay 665 operates and at its contacts 667 and 668 completes the operating circuit for the line relays 680 and 1000 at the respective stations. At contacts 669, relay 665 opens the metering circuit.

Reset relay 600 holds the impulse sending relay 665 operated, and consequently the line relays 680 and 1000 are energized until the reset operation has been practically completed.

Line relay 680 operates and at its contacts 681 effects the incidental operation of the first counting chain relay 215, the associated sequence relay 210 being held inoperative by the open condition of each of the series energizing circuits at this time, these circuits being held open at contacts 519 of operation code relay 515, contacts 632 of relay 630, contacts 662 of group code relay 660, contacts 629 of point check relay 624, and at contacts 615 of operation code control relay 610. Line relay 680 at its contacts 681 effects the incidental operation of relay 384 and at its contacts 682 also interrupts the operating circuit of reset relay 390, which being of the extra-slow to release type shortly deenergizes and at its contacts 392 effects the opening of the positive battery supply circuit for the following equipment: reset relay 600, group stop relay 670, group code relay 660, point stop relay 640, point code relay 630, start relays 326 and 332, first counting chain relay 215, indication agreement relay 515, the preliminary impulse relays 300 and 303, point guard relay 791, point group guard relay 794, point start relay 710, group start relay 725, group selection relays 420 and 430, point selection relay 190 and the point selection lamp 116. Reset relay 390, at its contacts 391, releases receiving relay 384. It should be noted that the length of the long reset signal is determined largely by the extra-slow-to-release characteristics of relay 390.

As reset control relay 600 (of the slow-release type) releases as a result of the opening of its potential supply source by the reset relay contacts 392, it is effective at its contacts 603 to interrupt the operating circuit for the impulse sending relay 665. Impulse sending relay 665 and start relay 322 in releasing recomplete the local operating circuit for line supervision relay 685. The equipment at the dispatch office is now completely restored for possible subsequent operations.

Referring now to the reset operation which occurs at the substation as the line relay 1000 thereat is operated during the long reset pulse under the control of the control station reset equipment, closed contacts 1001 complete an incidental operating circuit for the first counting chain relay 915 in the manner heretofore described. Line relay 1000 at its contacts 1001 also effects the operation of the receiving relay 835 over a circuit extending from battery over the winding of relay 835, contacts 813, 823, 843, C1336, contacts 1001 to ground. Receiving relay 835 operates and at its contacts 837 interrupts the holding circuit for the time delay relay 1098 and supervisory code relay 1030 to effect the restoration thereof. Supervisory code relay 1030 in its release is effective at its contacts 1033 to open the operating circuit for associated supervisory code relay 1020 to effect the restoration thereof.

A brief period of time after the energization of the line relay 1000, and opening of contacts 1002, the reset relay 840 releases and at its contacts 841 completes an operating circuit for an associated time delay relay 800. Time delay relay 800 operates and at its contacts 801 completes an operating circuit for an associated time delay relay 860.

Reset relay 840 releases and at its contacts 842 interrupts the potential supply for the following equipment at the substation to effect the restoration thereof: group code relay 1080, group check relay 1070, point code relay 1050, point check relay 1040, incoming start relay 870, counting chain relay 915, preliminary protective pulse terminating relays 850 and 855, group selection relays 1170 and 1180, point selection relay 1215 and metering relay 1292. At its contacts 843, reset relay 840 releases receiving relay 835.

Point selection relay 1215 releases and at its contacts 1219 interrupts the holding circuit for the indication control relay 970 to effect the restoration thereof. The equipment is now practically restored with the exception of the reset relay and the time delay relays associated therewith. As the reset operation at the control office is completed, operating circuits for the line relays 680 and 1000 are interrupted, as before described, and line relay 1000 restores. Line relay 1000 at its contacts 1002 recompletes an energizing circuit for the reset relay 840, which operates and at its contacts 841 interrupts the energizing circuit for the time delay relay 800. Relay 800, of the extra-slow-to-release type, after an interval restores and interrupts the operating circuit for the time relay 860 which, being of the extra-slow-to-release type, releases after an interval, the equipment at the substation is now reset in its restored condition and prepared for further supervisory operations.

It is apparent from the foregoing that with restoration of the substation incoming start relay 870 by the reset relay 840 and the restoration of impulse sending relay 665, the line supervision relay energizing circuit is completed, the circuit extending from positive battery at the substation through resistor 1018, over contacts 1011, line relay 1000, contacts 1014, line conductor 85, contacts 666, line relay 680, the winding of line supervisory relay 685, C31, contacts 325b, C30, resistor 659, contacts 669, line conductor 86, contacts 1012, C1361, contacts 888 and 873 through resistor 872′ to battery.

Line supervision relay 685 operates to restore supervision for the line, it being effective at its contacts 687 to effect restoration of the associated line supervision relay 690 and at its contacts 686 holds associate relay 695. Relay 690 releases and at its contacts 691 interrupts the energizing circuit for the alarm lamp 415 to extinguish same. The equipment is now in its normal restored condition, the signaling and line supervision paths at each station being connected in parallel with each other and in series with the line circuit.

It will be remembered that the foregoing circuit operations resulted from operation of the close key 408 following selection of a point in the substation, a code comprising five impulses having been transmitted by the control station to effect closing of the circuit breaker unit at the selected point. In the event that the selected unit is already in the closed position, the trip key 406 is operated after selection of the point and a code of three impulses is transmitted by the equipment to effect the tripping of the circuit breaker at that point. Briefly, relay 620 is operative alone to control the sending of three impulses much in the manner that it was operative with relay 510 heretofore to send five impulses for the close code. A detailed description of this operation is not believed necessary at this point, the operation being apparent to those skilled in the art.

*Substation report of automatic circuit breaker operation*

Provision is also made for reporting to the dispatcher's office of an automatic trip by an automatic close of a circuit breaker.

With the automatic operation of a circuit breaker to a different position, such as is frequently caused by the occurrence of heavy overloads on the protected lines, it is important that suitable notification be given to the attendant at the control office, so that corrective measures can be taken. In the presently disclosed arrangement, such notification is effected by the transmission of informative coded pulses by the substation to the control station, the equipment thereat being effective to change the lamp indications to show the new position of the device and to operate suitable audio and visual alarm equipment thereat.

Specifically, with restoration of a circuit breaker, the substation equipment is responsively conditioned for automatic impulse transmission, the transmitting equipment being first operative to send a series of "key" or unlocking pulses followed by a set of coded impulses which are representative of the group with which the restored circuit breaker is associated.

The control station, on receipt of the first key pulse, conditions itself for impulse reception and upon registration of the group signal sends back a set of coded check-back impulses which indicate the value of the group signal received and registered. The substation accepts the check-back signal, and upon agreement of the original signal and check-back signal returns a coded signal which is indicative of the point in the group with which the restored circuit breaker is associated. The control station, on receipt of the point signal, effects registration thereof and the return of a check-back signal which indicates the value of the point signal received and registered.

Following receipt of the point check information from the control office and the agreement thereof with the originally transmitted point signal, the equipment at the substation will initiate transmission of a set of indication pulses which inform the attendant that the automatic operation has occured, such code in the present embodiment comprising a code of three impulses. With receipt thereof, the proper alarm signal at the control office will be operated to indicate to the attendant that an automatic operation has occurred at the substation and the particular position to which that circuit breaker has been operated. Reset of the substation and control office equipment is then automatically effected by the control station.

Inasmuch as the signaling in this event is initiated by the substation, outgoing start relay 880 is operated for the period of the signaling, and telemetering is not effected. Accordingly reference is made to the aforementioned copending application for the details of the detailed circuit operations in the substation report of an automatic circuit breaker operation.

*Report of automatic change of indication at substation during the metering period*

An important feature of the invention is the manner in which the equipment is operative while at rest upon a point, and telemetering of that point is being effective, to report a change of position of a circuit breaker at another point. For example, assuming that the circuit breaker unit on point 11 should change position while the equipment is at rest on point 12 and metering of that point is being effected. An immediate report of the change of position of the equipment at point 11 is made to the attendant. The equipment is simultaneously operative to automatically interrupt the telemetering operation for point 12.

With reference to Figure 15, the manner in which the equipment is modified to include this embodiment is shown in a schematic skeleton form thereat. The provision of this special report equipment basically requires only the addition to the previously disclosed arrangements of a single relay which is designated as the telemetering protective relay 1500, and several new contact sets on the previously disclosed arrangement. The pertinent circuits of the equipment additionally includes reset control relay 845 and its associated contacts 848, time delay relay 860 and a new contact set including contacts 860' and 860", start relay 870 and new contacts 870', operation control relay 885, and additional contacts 885' and 885", and the group start relays 1190, 1194 etc. each of which has an additional associated contact 1190', 1194' etc. which extends to positive battery.

Assuming, for example, that the attendant has operated the selection key associated with point 12 and that the equipment has been operated in the manner heretofore described to come to rest upon point 12. Metering is thereupon immediately initiated and a report of the predetermined data for that point is transmitted to the attendant.

Incoming start relay 870 will be in the operated position at such time and energization of the outgoing start relays 875 and 880 is prevented. In that the outgoing start relays are used, with the operative one of the group start relays 1190, 1194, etc., to report a change of position of a circuit breaker, it is apparent that with the change of position of a circuit breaker in the substation equipment shown in the previous arrangement the reporting of such change could not be accomplished.

In the arrangement set forth in Figure 15, alternative means for initiating such report are provided. Assuming, for example, that a change of position occurs at point 11 while point 12 is being metered, the group start relay 1194 associated with the second group of points (of which point 11 is a member) will be operated in the manner described in the copending application.

As the group start relay 1194 operates, it is effective at its contacts 1194' to connect positive battery over conductor 1308', contacts 885", contacts 870', contacts 860", normally closed contacts 1502 of the telemetering interrupter relay 1500 and the winding of the reset control relay 845 to negative battery.

The reset control relay 845 operates and closes contacts 848 to lock to positive battery and thereby effect the operation of the impulse transmitting relay 1010 and the transmission of a long reset signal in the manner heretoforedescribed to effect the resetting of the office and substation equipment. It is important to note that with operation of the impulse sending relay 1010, contacts 1012 are opened to interrupt the metering circuit immediately and contacts 1013 are operative to complete a signal circuit at practically the same instant (Figure 14).

It will be remembered that a pair of time delay relays 800 and 860 are operated during each reset operation, and as the reset of the equipment at the substation has been accomplished by restored reset relay 840, the time delay relays 800 and 860 are still in the operated condition. As the reset relay 840 is subsequently reoperated, the time delay relays 800 and 860 are restored in a cascade manner and at this point (in a normal reset) the equipment is restored to its normal condition.

However, in this instance the reset has been accomplished as a result of a change of circuit breaker position and the effective group relay is still operated. Therefore, as the time delay relay 860 now restores, it is effective at its contacts 861 to complete an operating circuit for the outgoing start relay 880, the circuit extending from negative battery over the windings of relays 875 and 880 (see Figs. 8, 10 and 11) contacts 861, conductor 1316, contacts 1195 of the effective one of the group start relays 1194, conductor 1318 and contacts 874' to ground. Outgoing start relays 875, 880 operate and effects the reporting of the change of position of the particular circuit breaker at the substation in the manner set forth in the copending application under the heading "Substation report of automatic circuit breaker operation."

It is apparent therefrom that with the change of position of any one of the circuit breakers at the substation the corresponding group start relay will be operated to effect the reset of the equipment (even though the equipment may be at rest on another point) and to call the attention of the operator to such change of position. Further, it will be observed by reference to Figure 14 that such operation can be expediously accomplished by reason of the close coupling of the metering and registering paths. That is, with the operation of relay 1010 at the substation signal transmission is immediately effective without having to resort to the energization of separate circuit elements to effect a changeover from a metering circuit to a signaling circuit and a time delay of considerable length is thereby eliminated. In the inclusion of the aforedescribed reporting circuits certain measures are taken to insure disablement thereof in the event that certain adverse operating conditions occur. For instance, in the event that several circuit breakers change position simultaneously and the corresponding group start relays such as 1190', 1194' etc. are also simltaneously operated, it is apparent that a serious tieup of the equipment might occur as it reports each of these changes and the attendant may be prevented from correcting a particularly undesirable condition of one of the units.

Accordingly, in the event of the simultaneous occurrence of several changes of position, the equipment is arranged to permit seizure of the substation by the attendant prior to completion of the reporting operation.

For example, assume that the circuit breaker at points 13, 23 and 34 have simultaneously changed position, group start relays (1194, etc.) will operate in the described manner and a change of position report is initiated. Assume further that during the reporting operation the attendant desires to control a point at the substation, the selection key associated with the desired point may be operated even through the reporting operation initiated by the group start relay 1194 associated with point 13 is in progress.

Figure 7:
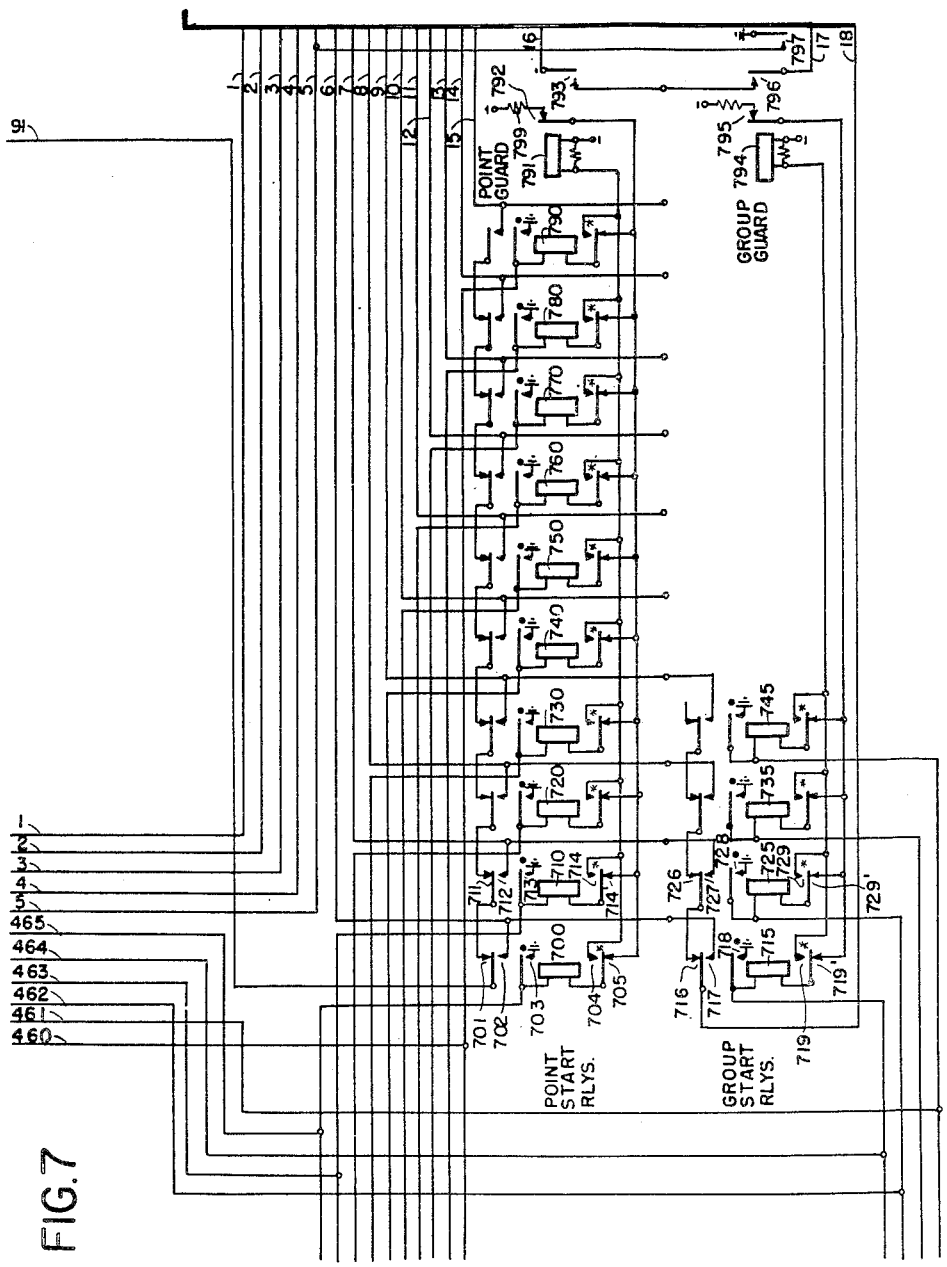
Figure 8:
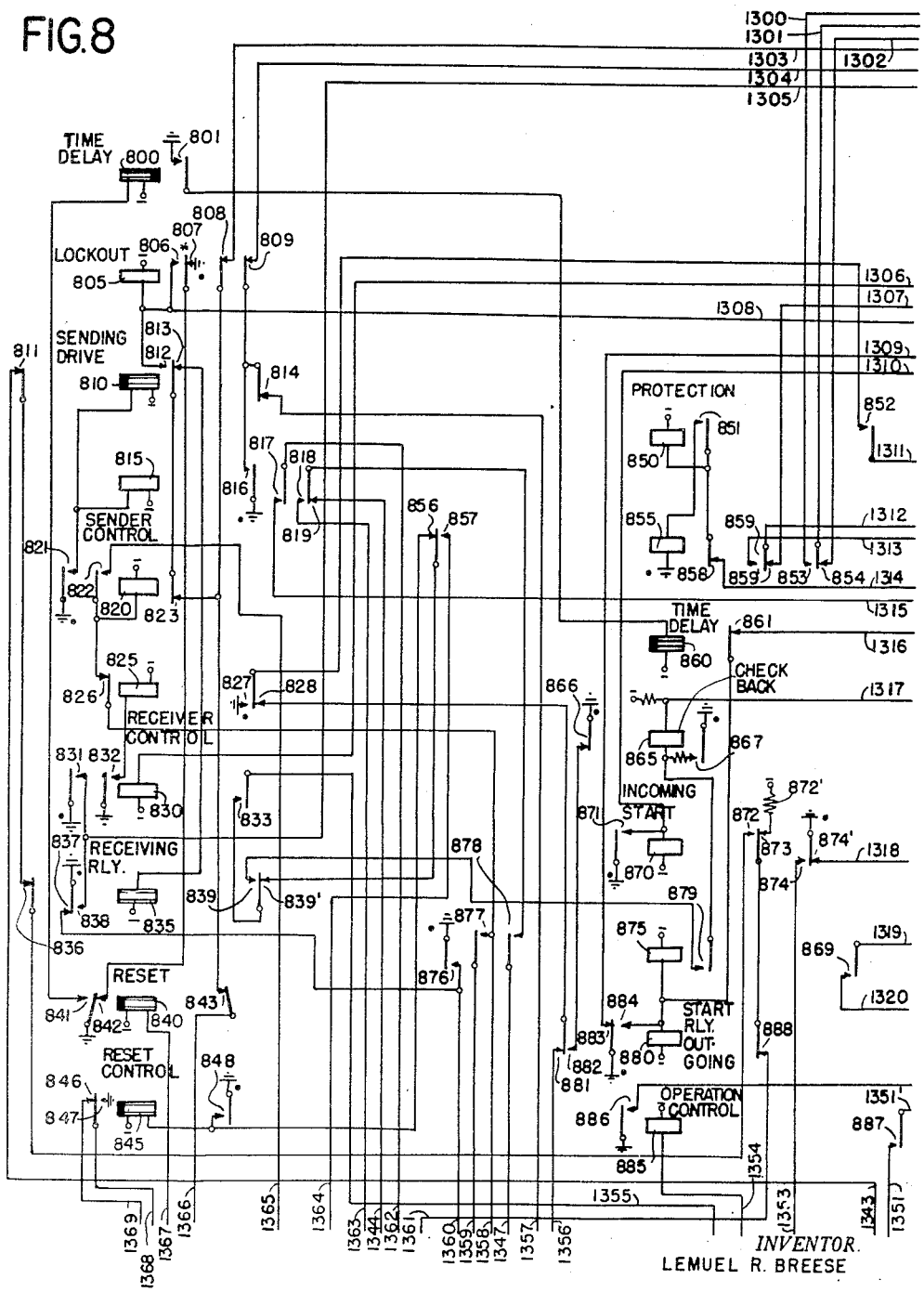
Figure 9:
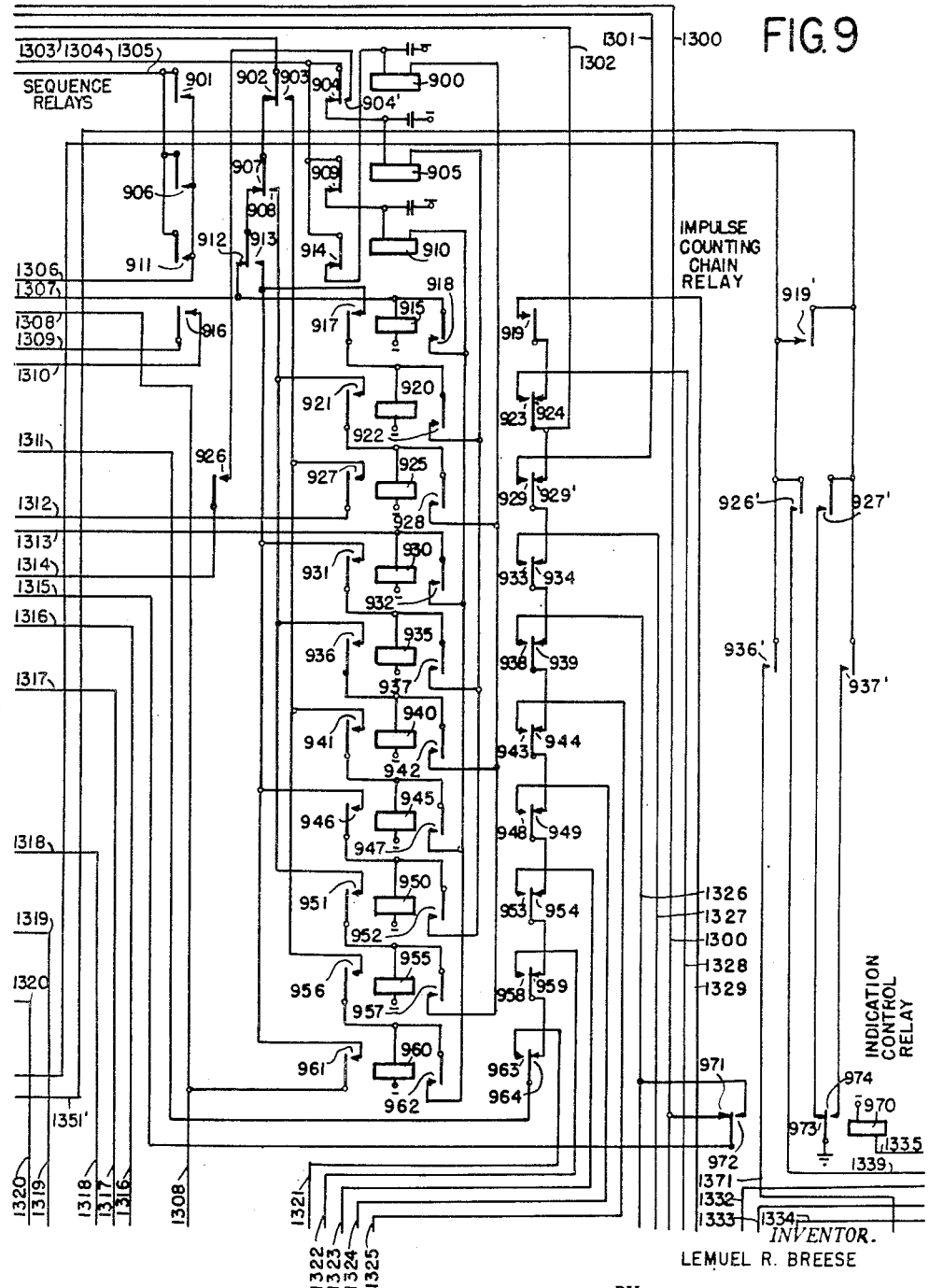
Figure 10:
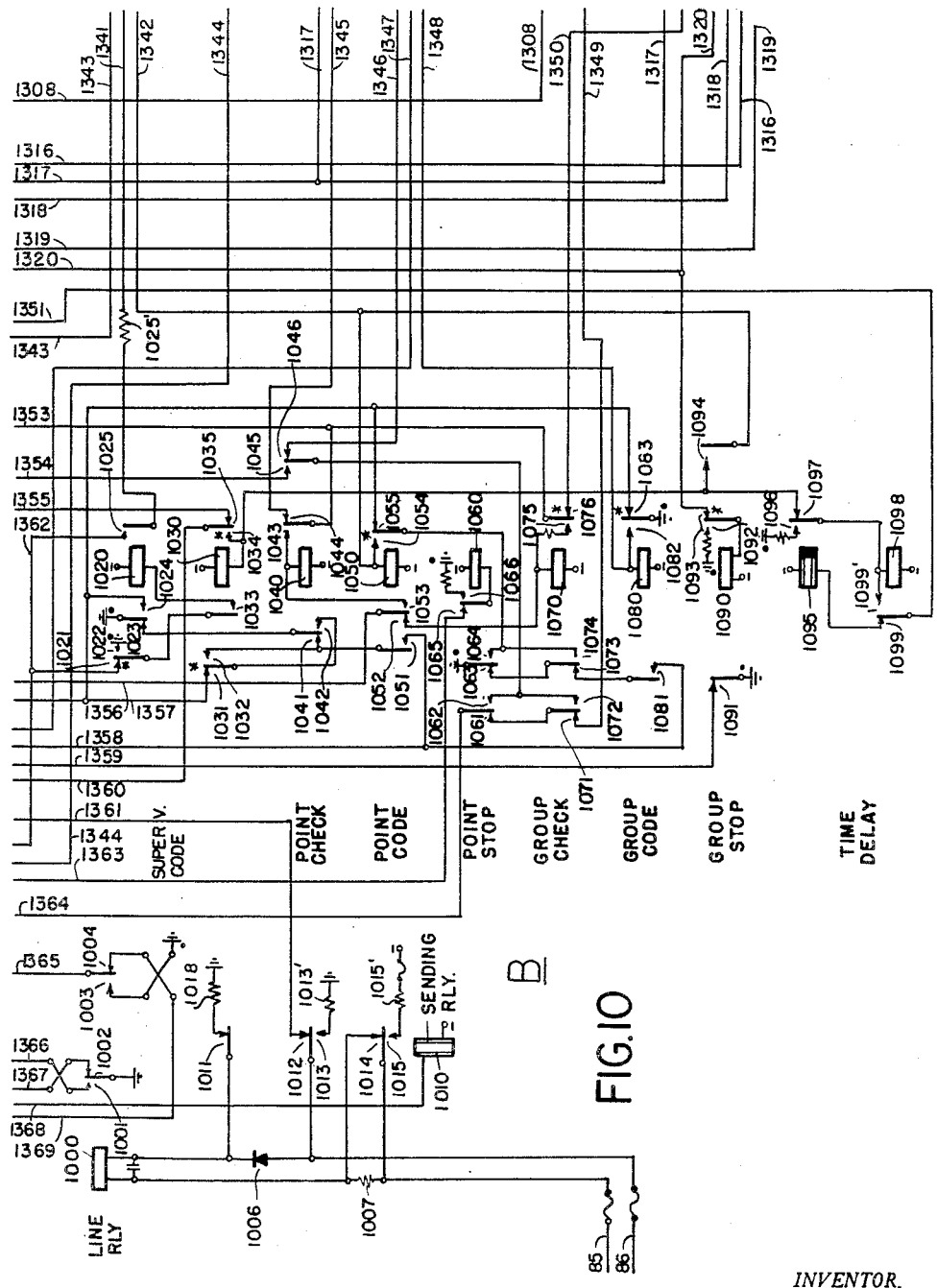
Figure 11:
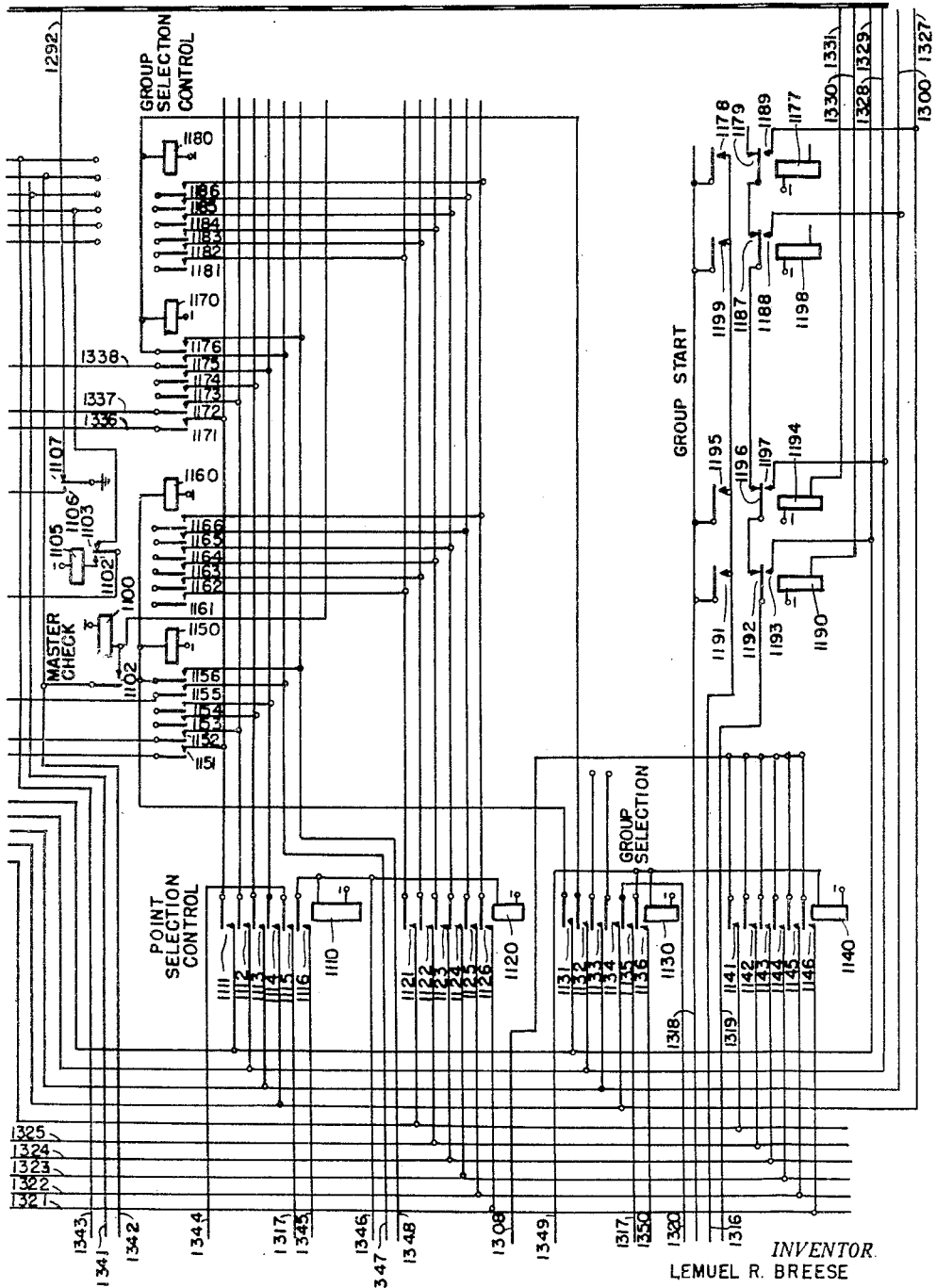

At the end of the reporting operation for point 13, reset of the equipment occurs and following this office reset relay 390 reoperates as previously described. Normally the equipment would continue to report the changes. Inasmuch as the selection key associated with point 12 has been operated by the attendant the group and point start relays 725 and 710, and guard relays 791 and 794 (Figs. 1, 4 and 7) will be in the operated position. As the reset relay 390 reoperates therefore a circuit for the outgoing start relays 322 and 326 will be completed which extends from negative battery over the relays 326 and 322, C16, contacts 793 and 796, C17 and contacts 320 to ground (Figs. 3 and 7). The sending control relay 360 and impulse sending relay are then energized to transmit the protective pulses followed by the group identification pulses.

Referring to the substation equipment and the time delay relay 860 thereat, it will be recalled that as the reset of the control and substation equipment is effected, the time delay relay 860 is maintained operated for a predetermined period of time following reset of the station equipment. Accordingly, as the first protective impulse is received from the control station as a result of the operation of the selection key at point 12, the substation time delay relay 860 will be in the energized condition and an operating circuit for the incoming start relay 870 is completed as heretofore described. In the protective arrangement shown in Figure 15 with operation of incoming start relay 870, contacts 870' are closed to complete an operating circuit for the telemetering protective relay 1500, the circuit extending from negative battery over the winding of relay 1500, contacts 860' of the time delay relay 860, contacts 870' of the incoming start relay 870, contacts 885'', conductor 1308' and the contacts of the effective group start relay which is still in the operative condition and which has not been reported at this time.

Telemetering protective relay 1500 operates and at its contacts 150' completes a self holding circuit and at its contacts 1502 opens the operating circuit for the reset control relay 845 to prevent the operation thereof by the effective group start relays which are still in the operated position and also to prevent the reset of the equipment. The seizure of the desired point and the desired control thereof may then be effected in the manner previously set forth. The release of the telemetering protective relay 1500 and continuation of the report of the changes of position will be as heretofore described as the attendant releases his control of the equipment. It is to be understood that each of the changes would have been reported in turn if the attendant does not operate a selection key for control purposes as described.

The reporting circuit shown in the modification of Figure 15 is also arranged to be disabled in the event that a control code is received by the substation for operating the circuit breaker at the point on which the equipment has been brought to rest. Specifically, assuming that the equipment has been brought to rest upon point 12 of the equipment and that the operator has transmitted a control code to the substation to effect the closing or tripping of the circuit breaker at point 12. Operation control relay 885 is operated in the manner previously described responsive to receipt of the control code and at its contacts 885' (Fig. 15) prepared an operating circuit for the telemetering protective relay 1500. As the point relay 1235 (Fig. 12) associated with the circuit breaker at point 12 is operated to its new position point relay 1270 is released and the associated group start relay 1194 will be incidentally operated at this time.

As the group start relay 1194 operates it is effective at its contacts 1194' (Fig. 15) to complete an operating circuit for the telemetering protective relay 1500, the operating circuit extending from negative battery over the winding of relay 1500, contacts 885' of the operated operation control relay 885, conductor 1308', contacts 1194' to positive battery. The telemetering protective relay 1500 in operating is effective at its contacts 1501 to lock itself to positive battery over the power source controlled by the reset relay 840, and at its contacts 1502 is operative to open a point in the circuit for the reset control relay 845 to prevent the operation thereof as the group start relay 1194 is operated and attempts to reset the equipment to initiate a change of position report.

The reporting of the change of position is effected in the normal manner, that is, the time delay relays 1095 and 1098 are operated by the point relay 1235 to initiate operation of the supervisory code transmitting relay 1030 and the initiation of the reporting cycle. Thus, the change of indication occasioned responsive to the transmission of control code is allowed to be sent in the normal manner rather than to be picked up as an automatic change following reset which would also effect the sounding of the alarm bell at the control office. It is apparent that following reporting of the change of position the equipment resets and the operating circuit for the telemetering protective relay 1500 is interrupted to restore same to its normal position.

It is noted that the equipment is operative in a similar manner to report a change of indication at a point which is in the process of being metered as the change occurs.

It is seen from the foregoing that in addition to providing means for reporting the automatic change of position of a circuit breaker at a point while the equipment is at rest on another point and is telemetering data of that other point to the control station, such operation is accomplished without danger of loss of control to the control station and without danger of long equipment tie-ups. Through the provision of such reporting means, the attendant may safely bring the equipment to rest on a given point for lengthy time periods for the purpose of making a study of the condition at such point as presented by the telemetered indications, the equipment being such that in the event of the automatic change of position of circuit breaker unit at any one of the other positions during such period, a report thereof will be immediately made to the attendant.

Conclusion

It is apparent that the telemetering arrangement set forth herein is operable to effect extremely reliable and efficient transmission of information between the points of a control and controlled station. Moreover, the comparatively simple and economical structure of the telemetering arrangement encourages the use thereof with most types of supervisory control systems, and especially encourages the use thereof with the more economical type of control equipment which is adapted to effect the control of remotely situated apparatus over a single interconnecting channel.

The inherent integralness of the signalling and metering circuits in such arrangement insures extremely safe and dependable operating conditions, the arrangement being such that there is no possible overlapping of the signalling and telemetering functions. In addition to the maintenance of a more strict line of division between these functions, the signalling apparatus is continually prepared for operation and more reliable control of the stations is thereby permitted. Of noted importance is the fact that the improved circuit operating conditions have been accomplished without resorting to the addition of further operating members, and, in fact, involves the elimination of an appreciable number of units which have previously been used in prior art arrangements. This, of course, means a more economical structure and a circuit which is quicker in operation.

Many additional operating features are provided by the novel telemetering arrangement. For instance, the rapid fire transfer from telemetering on a point to substation signalling of a change of circuit breaker position on another point is extremely important in the accomplishment of a quick and safe operating arrangement. An additional advantage inherent in the disclosed arrangement is the manner in which the substation line relay is pre-energized by the metering current whenever such transposition of circuits occurs whereby a more positive action thereof is effected as the first of the signal impulses arrive.

Then, too, the disclosed parallel circuit (in contrast with the known conventional type series line circuits) does not require superimposing of metering current on a signalling current and thus does not require special metering calibration.

These and other features and advantages set forth herein clearly teach a telemetering arrangement which is new and novel in its structure and which is a desirable advancement in the art. Other obvious features of the invention which are believed to be new are set forth in the following claims.

I claim:

1. In a supervisory system having at least two stations interconnected by a signal channel, each of which stations has a plurality of control points thereat and equipment for transmitting and receiving coded signals for selectively controlling said points, a signalling circuit at each station for connecting said receiving means at said respective stations with said signal channel in shunt circuit relation, and metering means associated with said points at both stations for supplying descriptive information concerning said points at one station to associated ones of said points at the other station, circuit means for connecting said metering means at each of said stations in a circuit parallel to the signalling circuits thereat and in series circuit relation with said receiving equipment and said channel, a source of potential arranged to be connected to said metering circuit at one of said stations so as to effect a current flow through the metering circuit in a given direction, and means at the other of said stations for controlling current flow in said parallel signalling circuit thereat in opposed relation to the directional current flow in said metering circuit.

2. In a supervisory system having at least two stations interconnected by a signal channel, each of which stations has a plurality of control points thereat and equipment for transmitting and receiving coded signals for selectively controlling said points, a signalling circuit at each station for connecting said receiving equipment at each station to said signal channel in shunt circuit relation, and metering means associated with said points at both stations for supplying descriptive information concerning said points at one station to associated ones of said points at the other station, said metering means at each of said stations being connected in a circuit parallel to the signalling circuit thereat and in series with said receiving equipment and said channel, a source of potential arranged to be connected to said metering circuit at one of said stations in such manner as to effect a current flow through said metering circuit in a given direction at both stations, means in said signalling circuit at said one station to effect a current flow in the same direction so that in the metering circuit thereat, and means in the signalling circuit at said other station operative to control current flow therein to an opposite direction than that of said metering circuit.

3. In a supervisory system having at least two stations interconnected by a signal channel, each of which stations has a plurality of control points thereat and equipment for transmitting and receiving coded signals of a given polarity for selectively controlling said points, a signalling circuit at each station for connecting said receiving equipment at each station to said signal channel in shunt circuit relation, metering means associated with said points at both stations for supplying signals of a second polarity to provide information concerning said points at one station to associated ones of said points at the other station, said metering means at one of said stations comprising a plurality of transmitter units, each being individual to an associated point, and at the other of said stations comprising a plurality of indicating units each being individual to an associated point, and means at each of said stations responsive to selection of a point by said equipment to connect the transmitter and the indicating means for the point in branch circuit relation with a position of the signalling circuits at the respective stations and in series with said channel, and polarity responsive means for extending the meter and control signals received over the corresponding paths at each station.

4. In a supervisory system having at least two stations interconnected by a signal channel, each of which stations has a plurality of control points thereat and equipment for transmitting and receiving coded signals for selectively controlling said points, a signalling circuit at each station for connecting said receiving equipment at each station to said signal channel in shunt circuit relation, and metering means associated with said points at both stations for supplying descriptive information concerning said points at one station to associated ones of said points at the other station, said metering means at one of said stations comprising a plurality of transmitter units for conveying indications in the form of varied electrical values, each transmitter being individual to an associated point, said metering means at the other of said stations comprising a plurality of indicating units, each being individual to a corresponding associated point, a metering circuit arranged to be connected in parallel relation to said signalling circuits and in series relation with said channel and said signal receiving equipment, means for connecting an associated one of said transmitters and said indicator units to said metering circuit, said transmitter current output being caused to flow over said metering circuit in a given direction and means in the signalling circuit at said other station for preventing current flow through said signalling circuit thereat in said given direction.

5. In a supervisory system having at least two stations interconnected by a signal channel, each of which stations has a plurality of control points thereat and equipment for transmitting and receiving coded signals for selectively controlling said points, a signalling circuit at each station for connecting said receiving equipment at each station to said signal channel in shunt circuit relation, means at each of said stations for transmitting a series of signals of a given polarity over said signalling circuits and channel to effect selection and control by one of the stations of a desired one of said points at the other of said stations, metering mean for providing a metering current of a second polarity which is indicative of the conditions existing at the point selected means for automatically connecting said metering means to said channel in branch circuit relation with a portion of said signalling circuits and in series with said channel responsive to selection of a point, and polarity responsive means connected to control passage of said metering and control signals over the corresponding paths at each station.

6. In a supervisory system having at least two stations interconnected by a signal channel, each of which stations has a plurality of control points thereat and equipment for transmitting and receiving coded signals for selectively controlling said points, a signalling circuit at each station for connecting said receiving equipment at each station to said signal channel in shunt circuit relation, means at each of said stations for transmitting a series of signals of a first polarity over said signalling circuits and channel to effect control by one of the stations of a desired one of said points at the other of said stations, and non-base current selective metering means for providing a metering current of a second polarity which is indicative of the conditions existing at the point selected, means for connecting said metering means at each station to said channel in branch circuit relation with a portion of said signalling circuit and in series with said channel responsive to selection of a point, and rectifier means in said signalling circuit at said one station for permitting flow therethrough of the control signals and preventing the flow of said metering signals therethrough, whereby said signalling circuits may be continuously connected to said channel during said metering operation.

7. In a supervisory system having at least two stations interconnected by a signal channel, each of which stations has a plurality of control points thereat and equipment for transmitting and receiving coded signals for selectively controlling said points, a signalling circuit at each station for locally transmitting signals of a first polarity imposed upon said channel, a line supervision circuit for providing signals of a second polarity to provide an indication of line conditions to one of the stations, said signalling circuit and said line supervision circuit being normally connected to said signal channel with said line supervision circuit being connected in parallel with a portion of said signal circuit, metering means at each station including a metering circuit for supplying signals of said second polarity for providing descriptive information concerning said points at one station to associated ones of said points at the other station, means for connecting said metering means at each station to said channel in branch circuit relation with said portion of the local signalling circuit thereat, and polarity responsive means for controlling extension of said control, metering, and line supervision signals over their corresponding circuits.

8. In a supervisory system having at least two stations interconnected by a signal channel, each of which stations has a plurality of control points thereat and equipment for transmitting and receiving coded signals for selectively controlling said points, a signalling circuit at each station for locally transmitting signals of a first polarity as imposed upon said channel, a line supervision circuit for providing signal indications of a second polarity to indicate faulty line conditions to one of the stations, said signalling circuit and said line supervision circuit being normally connected to said signal channel, said line supervision circuit being connected in branch circuit relation with a portion of said signalling circuit, metering means at each station including a metering circuit for supplying signals of said second polarity to provide descriptive information concerning said points at one station to associated ones of said points at the other station, and means for connecting said metering means at each station to said channel in parallel with a portion of the local signalling circuit thereat subsequent to a given signalling operation, said signalling and metering circuits being maintained in said relative parallel connection with each other and said connection with said channel for the duration of the metering operation, and polarity responsive means for effecting extension of the respective signals through the assigned circuits at each station.

9. In a supervisory system having at least two stations interconnected by a signal channel, each of which stations has a plurality of control points thereat and equipment for transmitting and receiving coded signals for selectively controlling said points, a signalling circuit at each station for locally transmitting signals imposed upon said channel, a line supervision circuit for providing indications of faulty line conditions to one of the stations, said line supervision circuit being normally connected to said signal channel and in branch circuit relation with a portion of said signal circuit, metering means at each station including a metering circuit for supplying descriptive information concerning said points at one station to associated ones of said points at the other station, means for connecting said metering means at each station to said channel in parallel with the local signalling circuit thereat and for simultaneously disconnecting said line supervisory circuit from its connection with said portion of said signalling path, and signal control means for preventing passage of said line supervision and metering signals through said portion of said signalling circuit whenever said circuits are connected in branch relation therewith.

10. In a supervisory system having at least two stations interconnected by a signal channel, each of which station has a plurality of control points thereat and equipment for transmitting and receiving coded signals of a given polarity and current value for selectively controlling said points, a signalling circuit at each station normally connected to said signal channel, line supervision means including means for providing a line supervision signal of a second polarity and a current value less than that of said control signals for transmission over said channel, metering means including a current energizing source for supplying signals of said second polarity and of a current value less than that of said control signals to provide descriptive information concerning said points at one station to associated ones of said points at the other station, means for connecting said metering means at each of said stations in a branch circuit relation with a portion of the associated signalling circuit thereat, polarity responsive means at each station for controlling the various signals to be extended over their assigned circuits, and impedance means in said metering, signalling and line supervision circuits operative responsive to passage thereover of signals of said assigned predetermined values.

11. In a supervisory system having at least two stations interconnected by a signal channel, each of which stations has a plurality of control points thereat and equipment for transmitting and receiving coded signals for selectively controlling said points, a signalling circuit including rectifier means connected in a portion of said signalling circuit at each station, a metering circuit and a line supervision circuit at each of said stations arranged for connection in branch circuit relation with said portion of said signal circuit and for connection with said signal channel, and means for normally connecting said signalling and said line supervision circuits at each station to said signalling channel, and circuit means at each station for disconnecting said line supervision path from its branch connection with said portion of said signalling circuit and for preparing the branch connection of said metering path to said portion of said signalling circuit responsive to initiation of signal transmission over said channel.

12. In a supervisory system having at least two stations interconnected by a signal channel, each of which stations has a plurality of control points thereat and equipment for transmitting and receiving coded signals for selectively controlling said points, a signalling circuit, a metering circuit and a line supervision circuit at each of said stations arranged for connection in branch circuit relation with a portion of said signal circuit and for connection with said signal channel, said signalling and said line supervision circuits at each station being normally connected to said signalling channel, polarity responsive means at each station operative to prevent passage of said metering and line supervision signals through said portion of said signalling circuit impulse sending means at each of said stations for applying point selecting signals of a first polarity to said channel and said signalling circuits, means for applying a line supervision signal of a second polarity to said channel over said line supervision circuit means at each station for disconnecting said line supervision circuit, from said signalling circuit responsive to initiation of transmission of signals by one of said impulse senders, means at each station for effecting a metering operation transmitting signals of said second polarity and connecting said metering circuits in branch circuit relation with said portion of said signalling circuits responsive to completion of a point selecting operation, whereby said signalling circuit is prepared for immediate use during the metering operation, and contact means on said impulse senders operated responsive to operation thereof during a metering operation to terminate the metering connection and apply a signal to the prepared signalling circuit.

13. In a supervisory system having at least two stations interconnected by a signal channel, each of which stations has a plurality of control points thereat and equipment for transmitting and receiving coded signals of a first polarity for selectively controlling said points, a signalling circuit, a normally energized line supervision circuit and a metering circuit each including an energizing source for supplying signals of a second polarity and arranged for connection in branch circuit relation with a portion of said signalling channel, said line supervision and said signalling circuits being normally connected to said signalling channel, polarity responsive means at each station for effecting extension of said line supervision and metering currents over their assigned circuits impulse sending means at each station for applying signals to said channel including a line relay at each station connected said signalling channel for responding to said signal impulses to operate the associated station equipment, means at each station for disconnecting said line supervision path from said channel responsive to receipt of signals by said line relays and for simultaneously preparing connection of said metering circuit thereto, and means for completing said metering circuit responsive to selection of a point by said equipment, said line relay being connected to said channel in series with said metering circuit for the duration of the metering operation, whereby said metering energizing source pre-energizes the substation line relay for a subsequent operation by signals applied to said signal channel.

14. In a supervisory system having at least two stations interconnected by a signal channel, each of which stations has a plurality of control points thereat and equipment for transmitting and receiving coded signals of a first polarity for selectively controlling said points, a signalling circuit, a normally energized line supervision circuit and a metering circuit each including an energizing source operative to transmit signals of a second polarity which is arranged for connection in branch circuit relation with a portion of said signalling circuit, said line supervision and said signalling circuits being normally connected to said line channel, polarity responsive means for effecting the extension of said respective signals through their assigned circuits at each station impulse sending means at each station for applying signals to said channel, a normally de-energized receiving relay at each station connected in parallel with said signalling channel for responding to said signal impulses to operate the associated station equipment, means at each station for disconnecting said line supervision paths from said channel responsive to receipt of signals by said line relays and for simultaneously preparing connection of said metering circuits thereto, and means for completing said metering circuit responsive to selection and checking of a point by said equipment, said receiving relay at said stations being connected to said channel series with said metering circuit for the duration of the metering operation, whereby said metering energizing source pre-energizes said receiving relay at said substation for operation by signals applied to said signal channel by either of said stations subsequent to the metering operation.

15. A supervisory system as set forth in claim 14 in which said signal impulses are effected by the alternate application and removal of signals of a predetermined potential to the signal channel by said impulse sending means, which signals are of a predetermined potential value different than that of said metering and line supervision signals, and in which said receiving relays are energized in parallel with each other responsive to said signals.

16. In a supervisory system adapted for remote control purposes having at least a first and second station, each of said stations including equipment for transmitting and receiving coded signal impulses over an interconnecting signal channel to selectively operate controlled units disposed at each of the stations, and in which each selective operation includes transmission by the initiating one of the stations of a group of coded impulses which identify the chosen one of the control points and the return by the other station of a group of check-back impulses which indicate the point identified by the impulses originally transmitted, a signalling circuit and a normally energized line supervision circuit at each of said stations normally connected to said signal channel means associated with said signalling circuit for effecting transmission of signals of one polarity, and means associated with said line supervision circuit for transmitting signals of an opposite polarity, polarity responsive means connected at each station for effecting extension of the respective signals over their corresponding paths, means at each of said stations for disconnecting said line supervision circuit from said channel responsive to initiation of the transmission of point selecting impulses by one of said stations, a metering circuit at each of said stations, and metering control means at each of said stations for automatically connecting the metering circuit for the point to the channel responsive to completion of the selecting operation.

17. In a supervisory system having at least two stations interconnected by a signal channel, each of which stations has a plurality of control points thereat and equipment for transmitting and receiving coded signals for selectively controlling said points, a signalling circuit at each station for connecting said receiving equipment at each station to said signal channel in shunt circuit relation, impulse sending means at each of said stations for applying point selection signals of a given polarity to said channel and said signalling circuits including a line relay at each station connected in parallel with said signalling channel for responding to said impulses on said channel to selectively operate the associated station equipment, metering equipment arranged for connection in branch circuit relation with a portion of said signalling circuit at each station including means for transmitting signals of a polarity opposite to that of said point selection signals, polarity responsive means for effecting the extension of the respective signals over their assigned circuits, and means for energizing said metering equipment responsive to selection of a point by said equipment at one of said stations, said signalling line relays being connected to said signalling channel in series with said metering circuits for the duration of the metering operation, whereby said metering energizing source pre-energizes one of said line relays for an operation to be effected by the subsequent application of signals to said signal channel to control the selected point.

18. In a supervisory system having at least two stations interconnected by a signal channel, each of which stations has a plurality of control points thereat and equipment for transmitting and receiving coded signals for selectively controlling said points, selection means at each of said points at one station for effecting transmission of a series of representative signals over said signalling channel to effect control of the associated one of said points at the other of said stations, metering means operated responsive to selection of certain of said points to provide a metered indication over said channel of predetermined conditions existing at the selected one of said points, position control means at said one station for controlling operation of the equipment at a selected point to a desired one of various positions, position indicating means for each point for indicating and initiating transmission of a signal which is indicative of the change of position of the associated unit, signal alarm means at said first station, signal means at said second station for operating said signal transmitting equipment to transmit an alarm sounding signal over said channel to said signal alarm means at said other station whenever the change of position of a unit occurs automatically, and interrupter means for preventing transmission of said alarm sounding signal whenever the change of position is controlled.

19. In a supervisory control system having at least two stations interconnected by a signal channel, each of said stations having at least one control point and equipment thereat for transmitting and receiving coded signals for selecting and controlling said points, a signalling circuit at each station including a rectifier device connected in series circuit relation with said signal channel, control means associated with said points for effecting operation of electrical apparatus at the point at one station from a corresponding point at the other station, metering means at said points for supplying metering information from the point at said one station to the point at said other station, relay means responsive to selection of the point at said one station from the point at the other station to connect the metering means in substantially parallel circuit relation with the signalling circuit rectifier device at said stations, and additional relay means at each station operable to effect selective operation of said apparatus at the point at said one station from the point at said other station and effect disconnection of the metering means from the channel after said relay means operates.

20. In a supervisory control system having at least two stations interconnected by a signal channel, a signalling circuit at each station including signal responsive means and impedance means connected to said channel, means for applying signalling current of a polarity conducted by said impedance means to energize said signal responsive means at each station, metering means and line supervision means at each station, means operable to alternatively connect said metering means and said line supervision means to said signal channel in bridged relation with said impedance means at each station, and means operable to provide current of a polarity opposite to that of said signalling current to effect energization of said line supervision and said metering means as connected to said signal channel in said bridged relation.

21. In a supervisory control system having at least two stations interconnected by a signal channel, each of said stations having a plurality of control points and supervisory control equipment operable to transmit and receive coded signals for selecting and controlling said points, a signalling circuit connected to the channel at each station including impedance means connected therein, line supervision means at each station normally connected in bridged relation with said impedance means, metering means at certain of said points for supplying information concerning its associated point at one station to its associated point at the other station, means operable with selection of one of said certain points to connect said metering means at the selected point to the signal channel in bridged relation with said impedance means at each station, and simultaneously operable to disconnect said line supervision means from its connection therewith, means for providing signals of a first polarity to effect energization of said signalling circuit, and means for providing signals of a second polarity to effect energization of said line supervision means and the metering means as connected to the signal channel.

References Cited in the file of this patent

UNITED STATES PATENTS

| | | |
|---|---|---|
| 1,726,009 | White | Aug. 27, 1929 |
| 1,739,935 | White | Dec. 17, 1929 |
| 2,164,379 | Boswau | July 4, 1939 |
| 2,314,692 | Derr | Mar. 23, 1943 |
| 2,327,251 | Derr | Aug. 17, 1943 |
| 2,342,125 | Derr | Feb. 22, 1944 |
| 2,484,208 | Derr | Oct. 11, 1949 |
| 2,550,109 | Derr | Apr. 24, 1951 |
| 2,597,075 | Derr | May 20, 1952 |

FOREIGN PATENTS

| | | |
|---|---|---|
| 339,643 | Great Britain | Dec. 12, 1930 |